United States Patent
Nagaraj et al.

(10) Patent No.: US 7,719,533 B2
(45) Date of Patent: May 18, 2010

(54) GRAPH EXTRACTION LABELLING AND VISUALIZATION

(75) Inventors: Nithin Nagaraj, Bangalore (IN); Srikanth Suryanarayanan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1557 days.

(21) Appl. No.: 10/996,519

(22) Filed: Nov. 24, 2004

(65) Prior Publication Data

US 2006/0176306 A1   Aug. 10, 2006

(51) Int. Cl.
*G06T 11/20* (2006.01)
(52) U.S. Cl. .................... 345/440; 709/220
(58) Field of Classification Search .......... 345/440
See application file for complete search history.

(56) References Cited

U.S. PATENT DOCUMENTS

| | | | | | |
|---|---|---|---|---|---|
| 5,276,789 | A | * | 1/1994 | Besaw et al. ............... | 345/440 |
| 5,475,842 | A | * | 12/1995 | Gilbert et al. .............. | 717/160 |
| 6,112,015 | A | * | 8/2000 | Planas et al. ............... | 709/223 |
| 6,304,273 | B1 | * | 10/2001 | Bonnet ...................... | 345/440 |
| 6,349,261 | B1 | * | 2/2002 | Ohnishi et al. ............. | 701/209 |
| 6,654,803 | B1 | * | 11/2003 | Rochford et al. ........... | 709/224 |
| 6,728,566 | B1 | | 4/2004 | Subramanyan et al. ..... | 600/407 |
| 6,782,284 | B1 | | 8/2004 | Subramanyan et al. ..... | 600/407 |
| 7,454,428 | B2 | * | 11/2008 | Wang et al. ................ | 707/100 |

OTHER PUBLICATIONS

Latifi et al., Incomplete Star: An Incrementally Scalable Network Based on the Star Graph, Jan. 1994, IEEE, vol. 5, No. 1, pp. 97-102.*

* cited by examiner

*Primary Examiner*—M Good Johnson
(74) *Attorney, Agent, or Firm*—Patrick K. Patnode

(57) ABSTRACT

A technique is provided for modeling a network relationship via providing a graphical representation of the network relationship and labeling the graphical representation based on a symbol sequence. Further, one or more tools is provided by the present technique for interactively visualizing and/or analyzing the graphical representation of the network relationship based on the symbol sequence.

20 Claims, 18 Drawing Sheets

GRAPH EXTRACTION LABELLING AND VISUALIZATION

BACKGROUND

The invention relates generally to graphical modeling of a network and in particular to graphical modeling of a network based on symbol sequences.

A wide variety of techniques are employed to visualize and/or analyze various network relationship, such as blood vessel networks, neural networks, electrical circuit networks, power system networks, communication networks transport networks or any other network. One of the popular techniques of representing a network relationship is by providing a graphical representation of the network. Though the graphical representation of the network relationship enables visualization of the network relationship and associated problems, the analysis is typically performed manually.

For example, in a medical imaging application, a blood vessel network is manually analyzed to identify potentially life-threatening aneurysms, or to plan surgical operations, or for other purposes. Alternatively, computer implemented techniques may be employed for the analysis of the graphical representation of the network. However, these techniques generally employ a brute force graph search algorithm that may be computationally very intensive even for small graphs. In medical imaging applications, atlases are useful frameworks for the representation of anatomy derived from imaging data such as CT scan or MRI scan. Such atlases are used for finding and comparing "normal" and "abnormal" regions. However, a limitation of such a method requires spatial correspondence between the atlas and the case being compared with. Thus, a spatial registration is performed between the atlas and the case under comparison that is complex and prone to errors. An equivalent to an atlas in non-medical applications would include a standardized circuit diagram. The current techniques are therefore cumbersome and inefficient.

It is therefore desirable to provide an efficient method for intelligent, automatic, and interactive visualization and analysis of various network relationships. It is also desirable to provide a graphical representation of a network relationship that is spatially independent.

BRIEF DESCRIPTION

Briefly, in accordance with one embodiment of the technique, a method is provided for modeling a network relationship. The method includes providing a graphical representation of the network relationship and labeling the graphical representation based on a symbol sequence. In certain embodiments, the technique may include systems and computer programs that afford such functionality.

In accordance with another embodiment of the technique, a method includes extracting a planar graph from a n-dimensional data set representing a network relationship. The method also includes performing (n-1)-dimensional connectivity analysis on each of two successive (n-1)-dimensional data sets to generate one or more (n-1)-dimensional labels. The two successive (n-1)-dimensional data sets are extracted from the n-dimensional data set. The method also includes performing n-dimensional connectivity analysis on a portion of the n-dimensional data set comprising the two successive (n-1)-dimensional data sets to generate one or more n-dimensional labels and determining one or more edges and/or vertices of the network relationship based on the one or more n-dimensional labels and corresponding (n-1)-dimensional labels. In certain embodiments, the technique may include systems and computer programs that afford such functionality.

In accordance with a further embodiment of the present technique, a method is provided for labeling a planar graph. The method includes initializing each vertex of the planar graph with a unique symbol from a symbol sequence. The planar graph includes a plurality of vertices and one or more edges between a pair of vertices. The method also includes assigning each edge of the planar graph with another unique symbol derived via an invertible composite function applied on all symbols representing a plurality of vertices from one or more source vertices of the planar graph to a destination vertex of the respective edge. In certain embodiments, the technique may include systems and computer programs that afford such functionality.

In accordance with an additional embodiment of the present technique, a method is provided for modeling a network relationship. The method includes providing one or more tools for processing the network relationship based on a symbol sequence and providing a graphical interface for interactively visualizing and/or analyzing the network relationship via the one or more tools. In certain embodiments, the technique may include systems and computer programs that afford such functionality.

In accordance with another embodiment of the present technique, an imaging system is provided. The imaging system includes an imaging modality for imaging a network relationship and providing a n-dimensional data set representing the network relationship and a computer coupled to the imaging modality. The computer is configured to extract a graphical representation of the network relationship from the n-dimensional data set, label the graphical representation based on a symbol sequence and interactively visualize and/or analyze the graphical representation based on the symbol sequence.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present technique are generally directed toward graphical modeling of network relationships based on symbol sequences. These modeling techniques may be useful in a variety of contexts where a network relationship needs to be visualized and/or analyzed via a graphical representation. For example, network relationships include blood vessel networks, biological neural networks, electrical circuit networks, power distribution networks, communication networks, computer networks, transportation networks (e.g., trains, airplanes, automobiles, and boats), flow networks (e.g., sewage, fresh water, oil, gas, or traffic), or any other networks. Although the following discussion is limited to a few examples, a variety of networks and applications are within the scope of the present technique.

Figure 1:
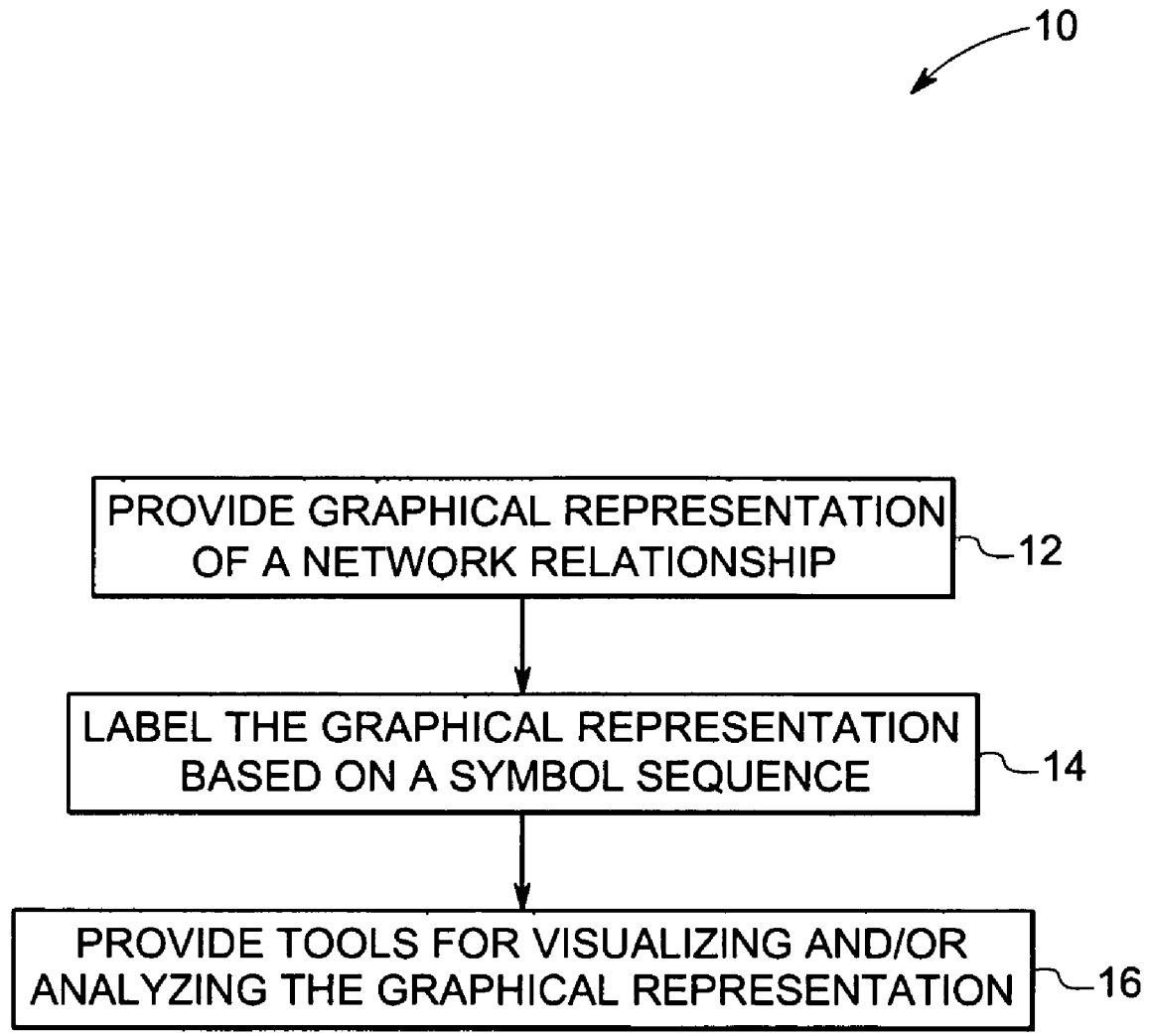
FIG. 1 is a flowchart illustrating an exemplary method of modeling a network relationship in accordance with one aspect of the present technique.

Referring now to FIG. 1, this figure is a flow chart that illustrates an exemplary process 10 of modeling a network relationship in accordance with one aspect of the present technique. As illustrated, the process 10 provides a graphical representation of a network relationship at block 12. For example, the graphical representation of the network relationship may be predefined or it may be extracted from an n-dimensional data set representing the network relationship as discussed in further detail below. Further, embodiments of the graphical representation include an operational direction of the network relationship and one or more vertices and/or edges of the network relationship, as discussed in detail below. The graphical representation of the network relationship is further labeled based on a symbol sequence at block 14. For example, each of the vertices, edges, and/or segments of the network relationship are labeled in a unique manner based on the symbol sequence. Examples of symbol sequence include a number sequence, a string sequence, an alphanumeric sequence or a sign sequence. In certain embodiments, the vertices, edges and/or network segments are labeled with symbols that accumulate from one portion to another within the network relationship. For example, each vertex may be labeled with a unique symbol, and then each edge or segment may be labeled with an accumulation of these unique symbols between and including the respective vertex and another vertex (e.g., a source) within the network relationship. The accumulation of these unique symbols may be comma delimited, additive, multiplicative, or may be achieved via concatenation or other mathematical and/or logical operations. Examples of string sequence include alphabets, words, or sentences. The number sequence may be either a super-additive number sequence or a super-multiplicative number sequence. Examples of the number sequence include a prime number sequence, a Fibonacci number sequence, a number sequence based on powers of a base number (e.g., powers of base 2), or other super-additive or super-multiplicative number sequences. Examples of sign sequence include geometric symbols, mathematical symbols, scientific symbols or any other symbols. Further, one or more tools are provided at block 16 for visualizing and/or analyzing the graphical representation of the network relationship based on various operations on the symbol sequence. For example, as discussed in further detail below, these tools may include an opacity variation tool, a color variation tool, a pruning tool, or other graphical processing tools that alter the graphical representation according to the unique symbolical labeling of the network relationship.

Figure 2:
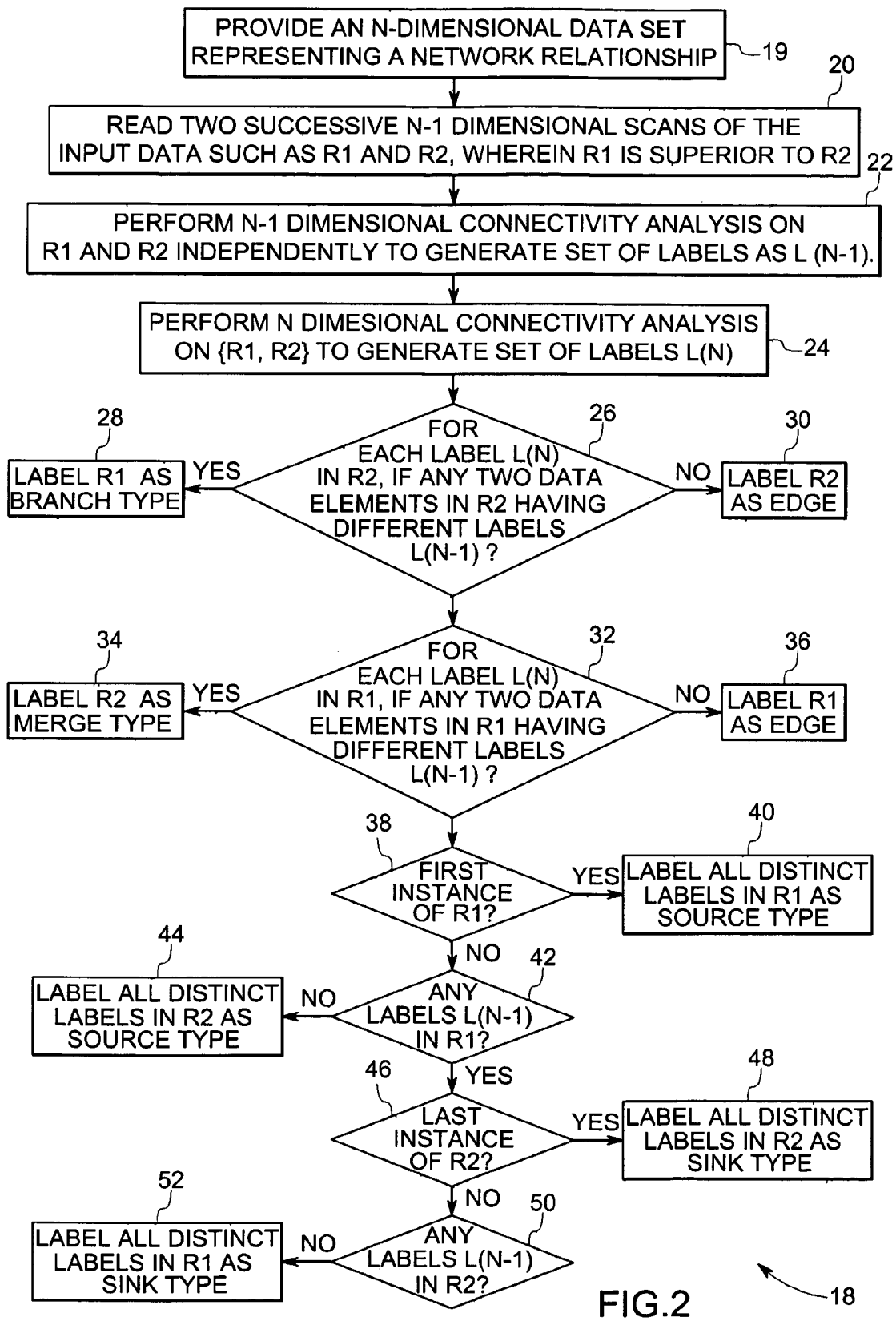
FIG. 2 is a flowchart illustrating an exemplary method of extracting a planar graph in accordance with one aspect of the present technique.

The graphical representation of the network relationship may be extracted from an n-dimensional data set representing the network relationship via a variety of techniques. For example, FIG. 2 is a flow chart that illustrates an exemplary process 18 for automatic extraction of the graphical representation from an n-dimensional data set. In one embodiment, the n-dimensional data set may be a binary data set representing a blood vessel network or a neurological network. These exemplary data sets may be obtained from a wide variety of medical imaging modalities, such as a Computed Tomography (CT) system, a Magnetic Resonance Imaging (MRI) system, an X-ray imaging system, and others. As discussed in detail below, extraction of the graphical representation from the n-dimensional data set includes numerically identifying one or more vertices and/or edges of the network relationship along with a direction for each edge. It should be noted that the vertices may be one of the five fundamental vertices, namely merge type (M-type) vertex, branch type (B-type) vertex, source type (S-type) vertex, sink type (Z-type) vertex or null type (N-type) vertex. An edge can be defined as a segment that joins a vertex $V_i$ with another vertex $V_j$ where i is not equal to j.

A merge vertex can be defined as a vertex where two or more incident edges have a direction feeding into the vertex and at least one incident edge has a direction feeding away from the vertex. A branch vertex can be defined as a vertex where two or more incident edges have a direction feeding away from the vertex and at least one incident edge has a direction feeding into the vertex. A source vertex can be defined as a vertex where all edges that are incident have a direction away from the vertex and no incident edges have a direction feeding into the vertex. A sink vertex can be defined as a vertex where all edges that are incident have a direction into the vertex and no incident edges have a direction feeding away from the vertex. A null vertex can be defined as a free vertex that has no edge incident upon it. A loop is combination of a branch type vertex and a merge type vertex on the same edge.

As illustrated FIG. 2, the exemplary process 18 begins at block 19 by providing an n-dimensional data set representing a desired network relationship. At block 20, the process 18 further includes reading two successive (n-1)-dimensional data sets from the n-dimensional data set. For example, the process 18 may include reading two successive rows or one-dimensional data set from a two-dimensional data set, which corresponds to a two-dimensional network image. The two (n-1)-dimensional data sets may be referred to as set R1 and set R2, where set R1 is superior to set R2. For example, the sets R1 and R2 may correspond to rows R1 and R2 or one-dimensional data sets from a two-dimensional data set. At block 22, the process 18 continues by performing an (n-1)-dimensional connectivity analysis on each of the two sets R1 and R2 independently to generate a set of labels L(n-1). For example, the process 18 may involve separately performing a one-dimensional connectivity analysis on each of the rows R1 and R2. At block 24, the process 18 further includes performing an n-dimensional connectivity analysis on a portion of the n-dimensional data set comprising the two successive (n-1)-dimensional data sets {R1, R2} to generate a set of labels L(n). For example, the process 18 may involve performing a two-dimensional connectivity analysis on rows R1 and R2, taken together. For each n-dimensional label L(n) in set R2, a discrepancy exists if any two data elements in set R2 having different (n-1)-dimensional labels L(n-1) is located at block 26. In case of such a discrepancy, labels in R1 are labeled as a branch vertex at block 28. If there is no such discrepancy, labels in R2 are labeled as an edge at block 30. Similarly, for each n-dimensional label L(n) in set R1, a discrepancy exists if any two data elements in set R1 having different (n-1)-dimensional labels L(n-1) is located at block 32. In case of such a discrepancy, labels in R2 are labeled as a merge vertex at block 34. If there is no such discrepancy, labels in R1 are labeled as an edge at block 36.

Further, the process 18 checks for a first instance of R1 at block 38 and labels all distinct L(n-1) labels in the first instance of R1 as a source vertex at block 40. If it is not the first instance of R1 and if no labels L(n-1) are located in R1 at block 42, then all distinct labels L(n-1) in R2 are labeled as a source vertex at block 44. Similarly, the process 18 queries for a last instance of R2 at block 46 and labels all distinct L(n-1) labels in the last instance of R2 as a sink vertex at block 48. If it is not the last instance of R2 and if no labels L(n-1) are located in R2 at block 50, then all distinct labels L(n-1) in R1 are labeled as a sink vertex at block 52. Finally, the process 18 is repeated for all of the portions of n-dimensional data sets indexed as a series of (n-1)-dimensional data sets. The type of vertices may also provide information regarding the operational direction of the network relationship. For example, in a blood vessel network or a power distribution network, the operational direction of the network relationship will be from a source vertex to a sink vertex that is from heart to various organs in case of the blood vessel network or from generating station to consumer units in case of the power distribution network. However, it should be noted that in case of a computer network the operational direction depends upon flow of information between network devices.

Figure 3:
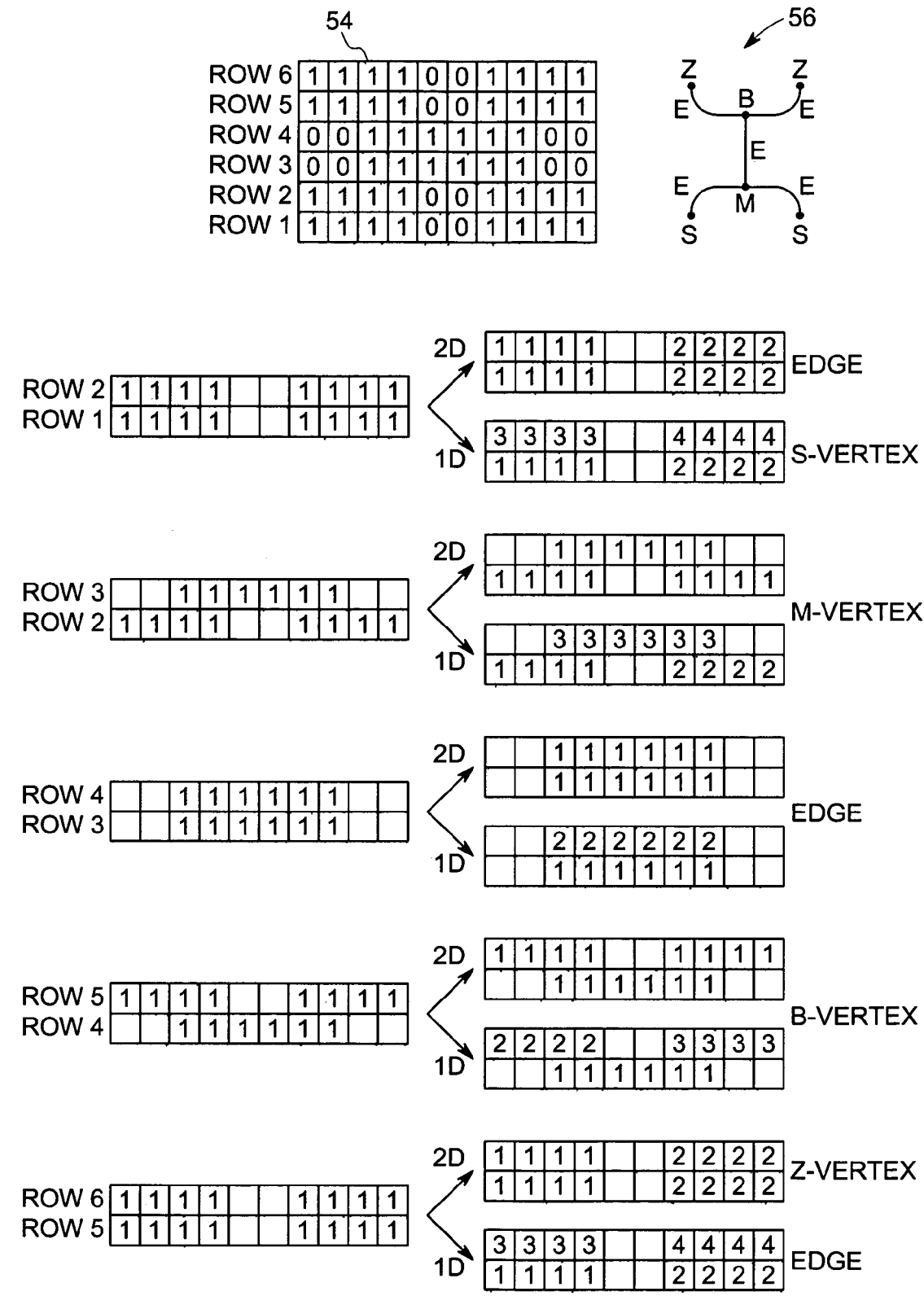
FIG. 3 is an example of graph extraction in accordance with the method illustrated in FIG. 2.

FIG. 3 illustrates an example of graph extraction in accordance with the process 18 described above. In the upper left portion of FIG. 3, a two-dimensional binary data set 54 is depicted. As described above, any two successive rows are picked at a time and a two-dimensional connectivity analysis is performed on a portion of the two-dimensional data set comprising the two successive rows to generate a set of two-dimensional labels L(2). In addition, one-dimensional connectivity analysis is performed on each of the two successive rows independently to generate a set of one-dimensional labels L(1). These two sets of labels L(2) and L(1) are compared with each other to extract graphical information, such as the presence of various type of vertices and/or edges. For example, as illustrated in the lower right portion of FIG. 3, one-dimensional and two-dimensional connectivity analysis is performed for each pair of successive rows such as row 1 and row 2, illustrated in the lower left portion of FIG. 3, to generate corresponding one-dimensional and two-dimensional labels L(1) and L(2), respectively. A continuity in presence of data elements represented by '1' is seen while performing two-dimensional connectivity analysis on a portion of two-dimensional data set comprising two successive rows, row 1 and row 2. Hence, a set of two dimensional label L(2)={'1', '2'} is generated. On performing a one-dimensional connectivity analysis on row 1, there exists a first and a second occurrence of continuous data elements. Further, on performing a one-dimensional connectivity analysis on row 2, there exists a third and a fourth occurrence of continuous data elements. A set of one-dimensional labels L(1)={1,2,3,4} is generated and assigned to the four independent sets of continuous data elements. The same labeling procedure is performed for the remaining rows in the two-dimensional binary data set 54.

Further, regarding rows 1 and 2, since row 1 is the first instance, all data elements with distinct labels L(1) of row 1 are labeled as a source vertex. In addition, for each two-dimensional label L(2) in row 2, any two data elements in row 2 have the same one-dimensional labels L(1). Thus all data elements in row 2 having distinct labels L(1) are labeled as an edge. When comparing labels L(2) and L(1) for row 3 and row 2, a discrepancy exists in row 2, because for each two-dimensional labels L(2) in row 2, there are two data elements having different one-dimensional labels in row 2. Hence all data elements in row 3 having distinct labels L(1) are labeled as a merge vertex. All data elements in row 4 having distinct labels L(1) are labeled as an edge because no discrepancies in one-dimensional labels L(1) are located for each two-dimensional label L(2) in row 4. However, on comparing labels L(2) and L(1) for row 5 and row 4, a discrepancy exists in row 5 because for each two-dimensional label L(2) in row 5, there are two pixels having different one-dimensional labels in row 5. All data elements in row 4 having distinct labels L(1) are therefore relabeled as a branch vertex. Further, on comparing labels L(2) and L(1) for row 6 and row 5, for each two-dimensional label L(2) in row 5, any two pixels in row 5 has the same one-dimensional labels L(1). Thus, all data elements in row 5 having distinct labels L(1) are labeled as an edge. Finally, since row 6 is the last instance all data elements in row 6 having distinct labels are labeled as sink vertex.

Once the set of vertices and their type have been identified along with the edges connecting two vertices, a graph 56 can be constructed as illustrated in the upper right portion of FIG. 2. As described in the above example, the process 18 is repeated for all the portion of two-dimensional data sets indexed as a series of one-dimensional data sets to extract the graph 56.

Figure 4:
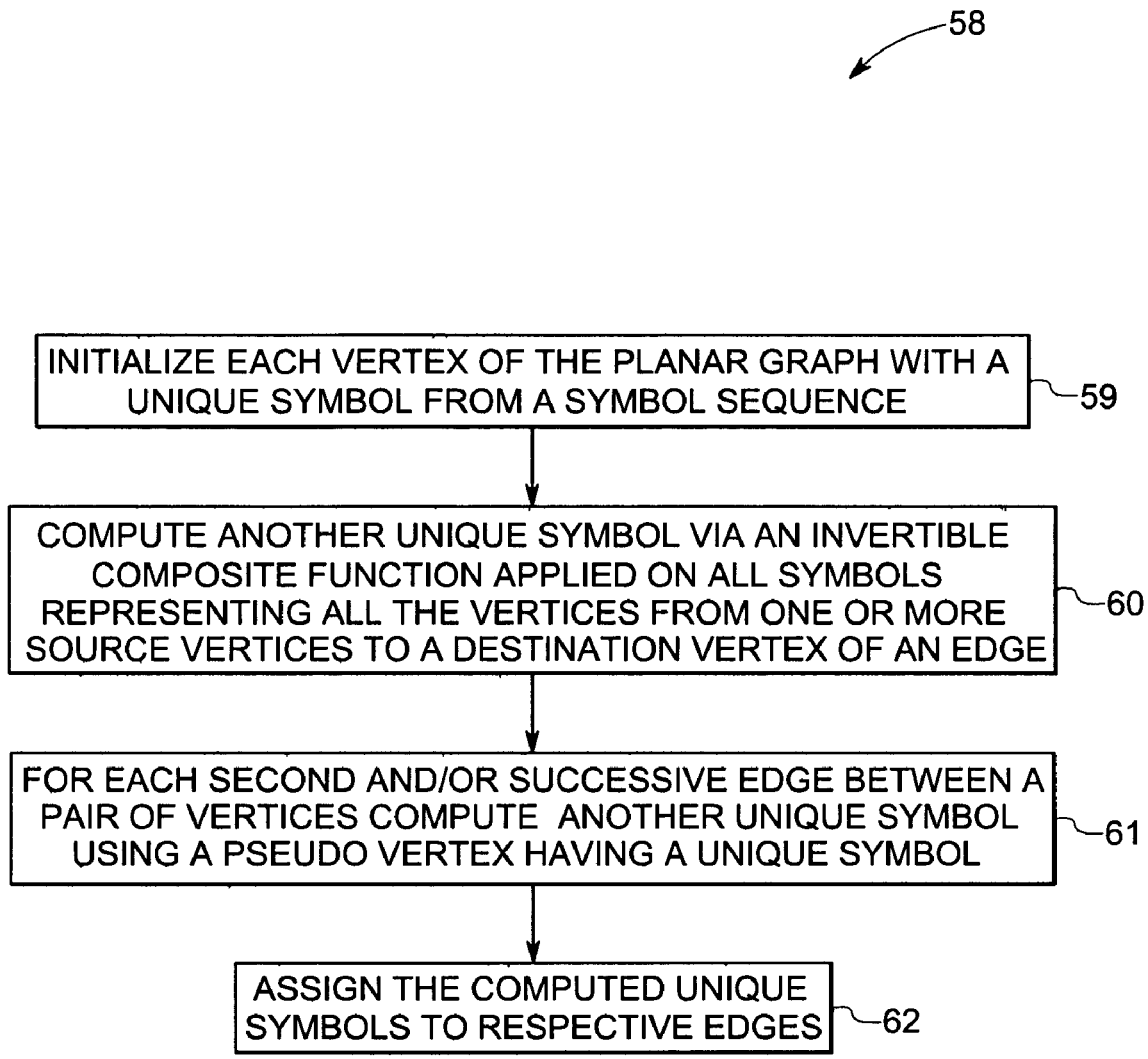
FIG. 4 is a flowchart illustrating an exemplary method of labeling a planar graph in accordance with one aspect of the present technique.

The graphical representation of the network relationship thus obtained is labeled based on a symbol sequence in accordance with an exemplary process 58 depicted in FIG. 4. As illustrated in block 59, the exemplary process 58 includes initializing each vertex of the planar graph with a unique symbol from a symbol sequence. At block 60, the process 58 continues by computing another unique symbol derived via an invertible composite function applied on all symbols representing all the vertices from one or more source vertices of the planar graph to a destination vertex of an edge. The particular edge is then labeled with the computed symbol. An invertible composite function is defined as a one-to-one mapping from the domain set of symbols to a range set of symbols such that a unique inverse exists. Thus, it is possible to recover the symbols that were originally mapped to. Examples of invertible composite function include a multiplication function on a super multiplicative number sequence, an addition function on a super additive number sequence, a union operation on the set of symbol sequence, or another mathematical and/or logical operations.

As described in further detail below, whenever there are two or more edges between the same pair of vertices, a pseudo vertex (P-type) is introduced for each second and/or successive edge between the pair of vertices in order to resolve conflict between the parallel edges. Each pseudo vertex is assigned a unique symbol from the symbol sequence. The second and/or successive edge is then labeled as described above using the pseudo vertex at blocks 61 and 62.

Figure 5:
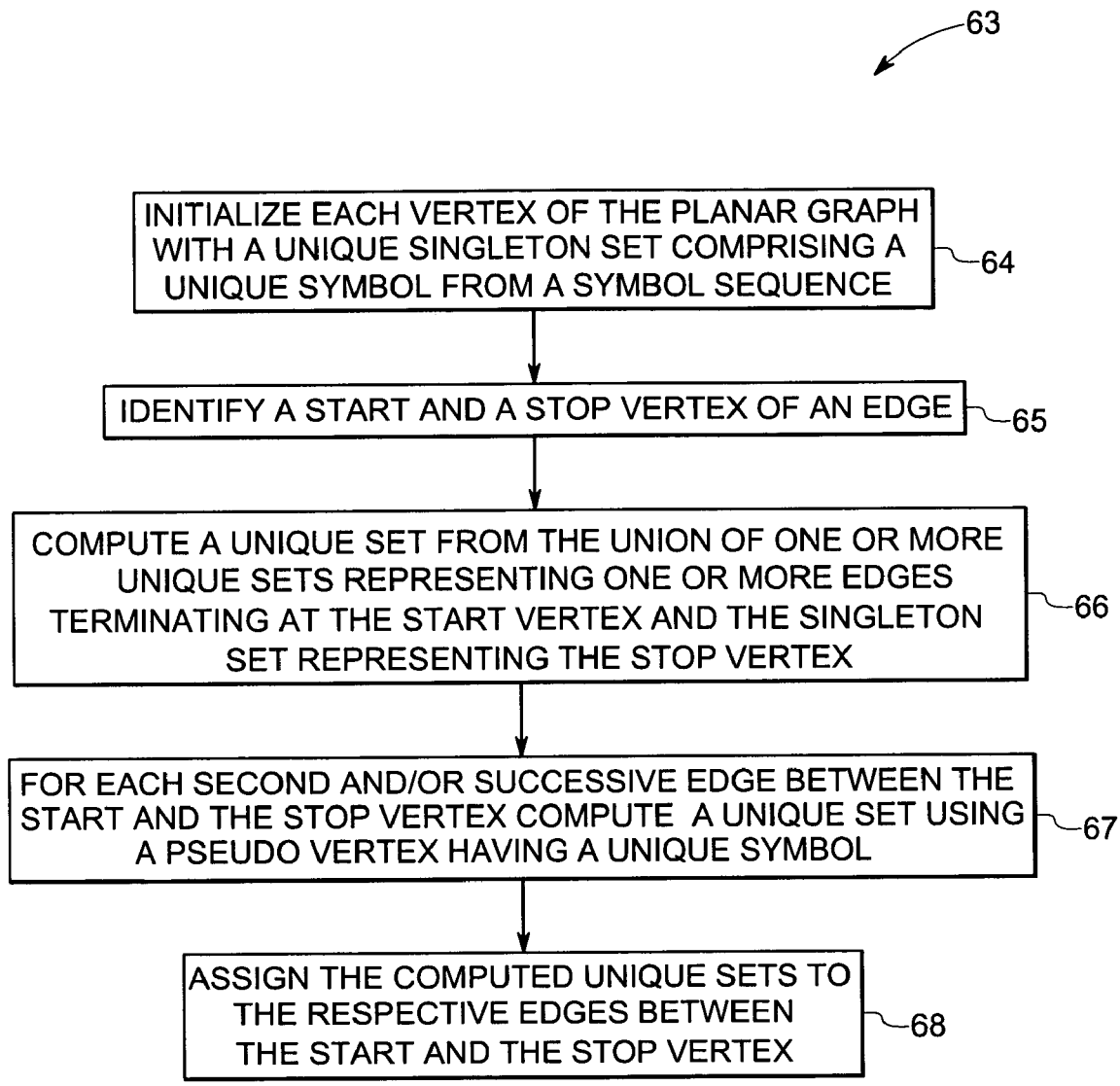
FIG. 5 is a flowchart illustrating the exemplary method of FIG. 4, including an example of an invertible composite function, in accordance with one aspect of the present technique.

In one embodiment, the exemplary process 58 is further elaborated with a 'union operation' as the invertible composite function. Referring now to FIG. 5, a process 63 includes initializing each vertex of the planar graph with a unique singleton set comprising a unique symbol from a symbol sequence at block 64. At block 65, the process 63 continues by identifying a start and a stop vertex for each edge connecting two vertices with a particular direction of flow from the start vertex to the stop vertex. Further, the process 63 includes computing a unique set from the union of one or more unique sets, which represent one or more edges terminating at the start vertex of a particular edge and, also, the singleton set representing the stop vertex of that particular edge at block 66. The particular edge is then labeled with the computed unique set. Alternatively, the unique set for a particular edge may be obtained by including all symbols representing the plurality of vertices from one or more source vertices of the planar graph to a destination vertex of the respective edge. Further, another invertible composite function, such as multiplication in a prime number sequence, or addition in a super additive sequence, may be used to generate another unique symbol from all symbols of the computed unique set, which may then be used to label the edge. For example, when a prime number sequence is used for labeling the planar graph and the invertible composite function used is multiplication, then LCM (least common multiple) of the labels of all edges terminating at the start vertex is computed and the result is multiplied with the stop vertex label to generate the label of the edge between the start and the stop vertex. The fact that every number can be uniquely represented as the multiplication of distinct prime factors makes 'multiplication' function a valid invertible composite function for a prime number sequence.

Further, each pseudo vertex is assigned another unique singleton set comprising the unique symbol from the symbol sequence. The second and/or successive edge is then labeled as described above using the pseudo vertex at blocks 67 and 68.

As would be appreciated by one skilled in the art, the process 58 for labeling the planar graph described above may be further extended to assign a unique code to each planar graph based on the unique set of symbols obtained above. Further, it should be noted that any two planar graphs may be compared with each other based on their unique code.

Figure 6:
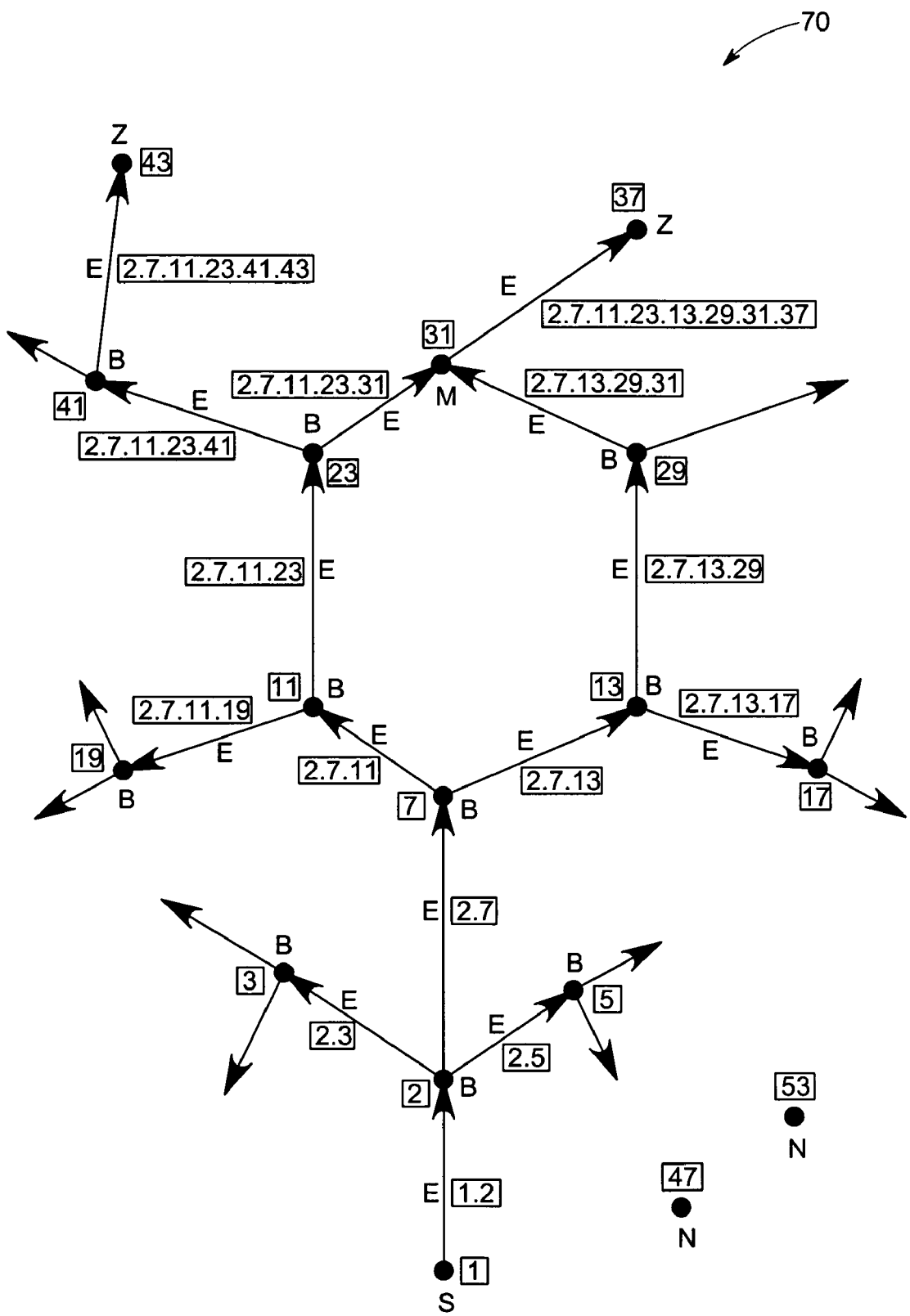
FIG. 6 is a graphical example of a generic labeled graph in accordance with the method illustrated in FIG. 4.

FIG. 6 illustrates an example of graph labeling in accordance with the process 58 described above. In the illustrated example, prime number sequence is used for labeling the graph 70. Each vertex is labeled with a unique prime number. It should be noted that for the sake of convenience, '1' is included in the list of primes={1, 2, 3, 5, 7, 11, 13, 17, 19, 23, 29, 31, 37, 41, 43 . . . }. For each edge, the arrow indicates the direction of flow. The LCM of the labels of all edges terminating at the start vertex of a particular edge is computed and the result is multiplied with the label of the stop vertex of that particular edge, thereby generating a unique number. The particular edge is then labeled with the generated unique number. As illustrated, the label of the edge terminating at vertex '2' is "1.2". The edge between vertex '2' and '7' is therefore "1.2.7" or simply "2.7". Further, the technique become clearer when looked at vertex '31'. The labels of edges terminating at '31' are "2.7.11.23.31" and "2.7.13.29.31". The edge between '31' and '37' is therefore labeled by a unique number that is equal to LCM of "2.7.11.23.31" and "2.7.13.29.31" times 37 or "2.7.11.13.23.29.31.37".

Figure 7:
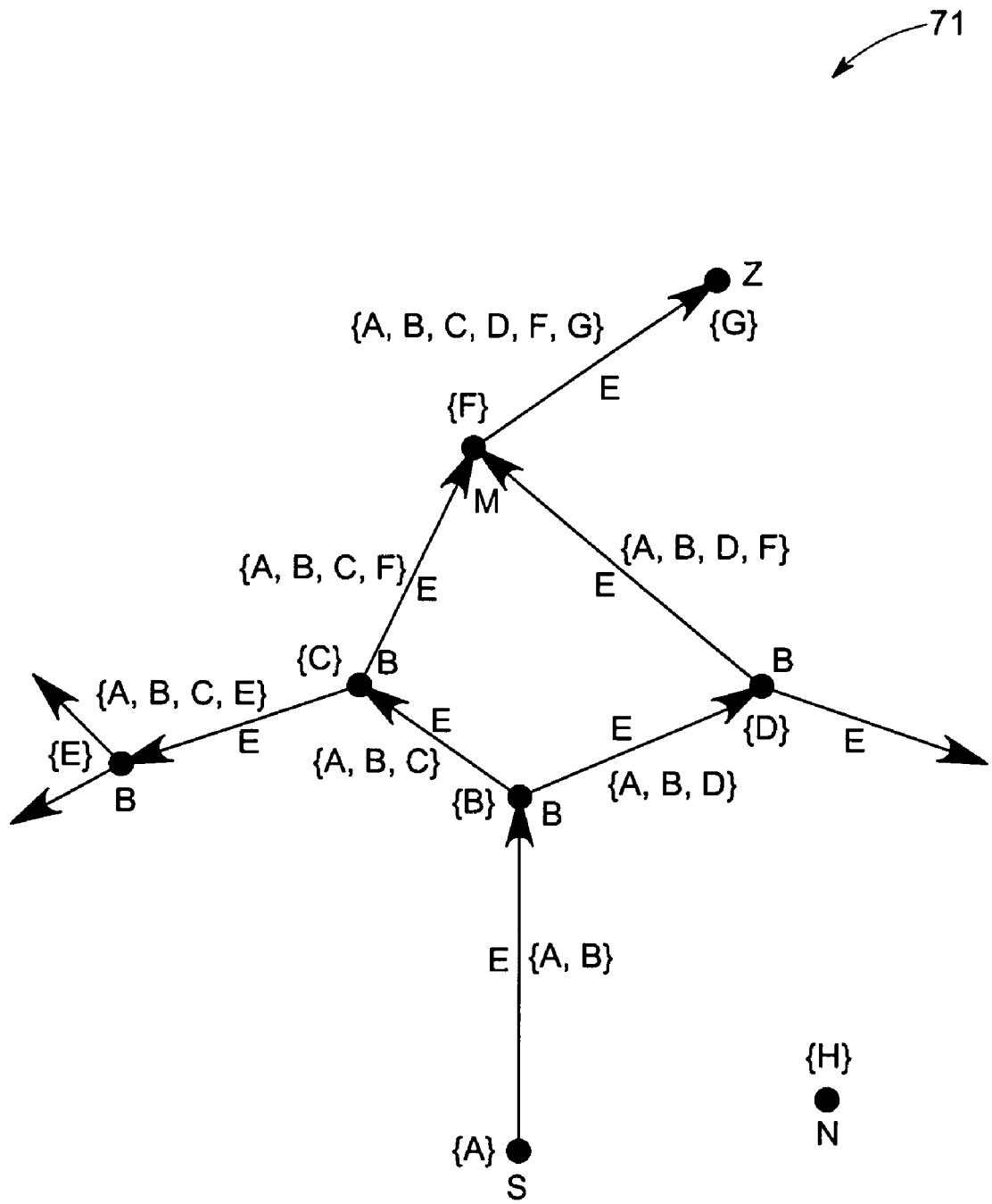
FIG. 7 is a graphical example of a generic labeled graph in accordance with the method illustrated in FIG. 5.

FIG. 7 illustrates another example of graph labeling in accordance with the process 63 described above. In the illustrated example, an alphabetic sequence is used for labeling the graph 71. Each vertex is labeled with a unique alphabetical character. For each edge, a start and a stop vertex is identified. Further, a unique set is computed from the union of labels of one or more edges terminating at the start vertex and the singleton set representing the stop vertex for a particular edge. The particular edge is then labeled with the resulting unique set. As illustrated, the label of edges terminating at {F} are {A, B, C, F} and {A, B, D, F}. The edge between {F} and {G} is therefore labeled by a unique set that is equal to union of {A, B, C, F}, {A, B, D, F} and {G} or simply {A, B, C, D, F, G}. Alternatively, in the illustrated example concatenation operation may be used as an invertible composite function. The labels of the edges terminating at 'F' will then be 'ABCF' and 'ABDF'. The label of the edge between 'F' and 'G' is then obtained by concatenating labels and 'ABCF', 'ABDF' and 'G' or 'ABCDFG'.

Figure 8:
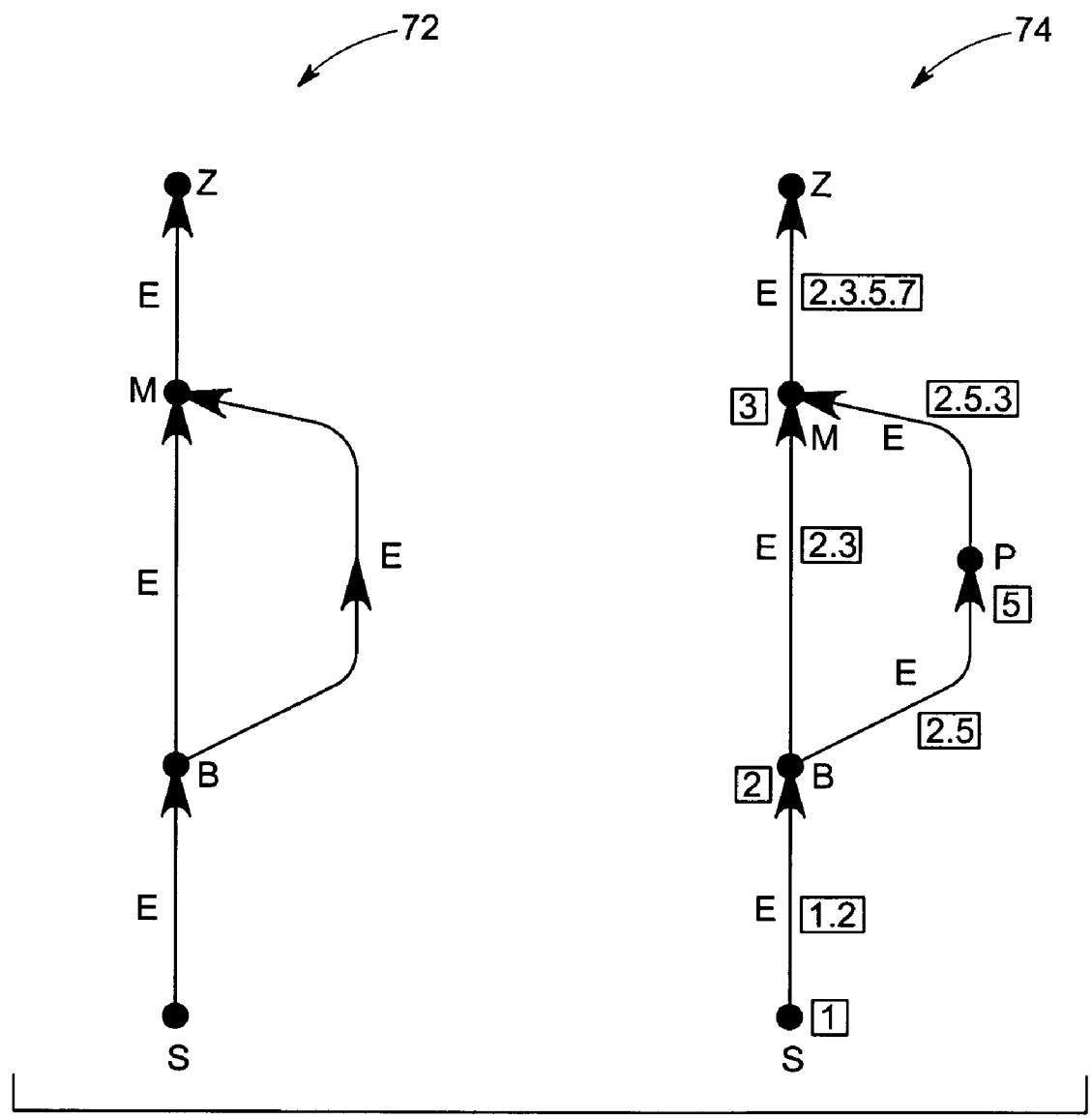
FIG. 8 is a graphical example of handling multiple edges between two vertices using a pseudo vertex in accordance with one aspect of the present technique.

An example of handling multiple edges between two vertices using a pseudo vertex is illustrated in FIG. 8. As illustrated, a graph 72 has two parallel edges between vertex B and vertex M. A pseudo vertex P is introduced in the second vertex between the vertex B and vertex M as shown in graph 74. The pseudo vertex P is assigned a unique number from the number sequence used for labeling the planar graph. The graph 74 is then labeled in accordance with the technique 58 described above.

As would be appreciated by one skilled in the art, the techniques described in above embodiments for graph extraction and graph labeling are not dependent on each other. A predefined graph may be provided and labeled in a similar manner while modeling a network relationship. Alternatively, the graph may be extracted and then labeled while modeling the network relationship. Further, the graph may simply be extracted in accordance with the technique and may be used for visualization and/or manual analysis of a complex network relationship and its associated problems. Further, it would be appreciated by one skilled in the art that the techniques described above may be used in a wide variety of network relationships.

Figure 9:
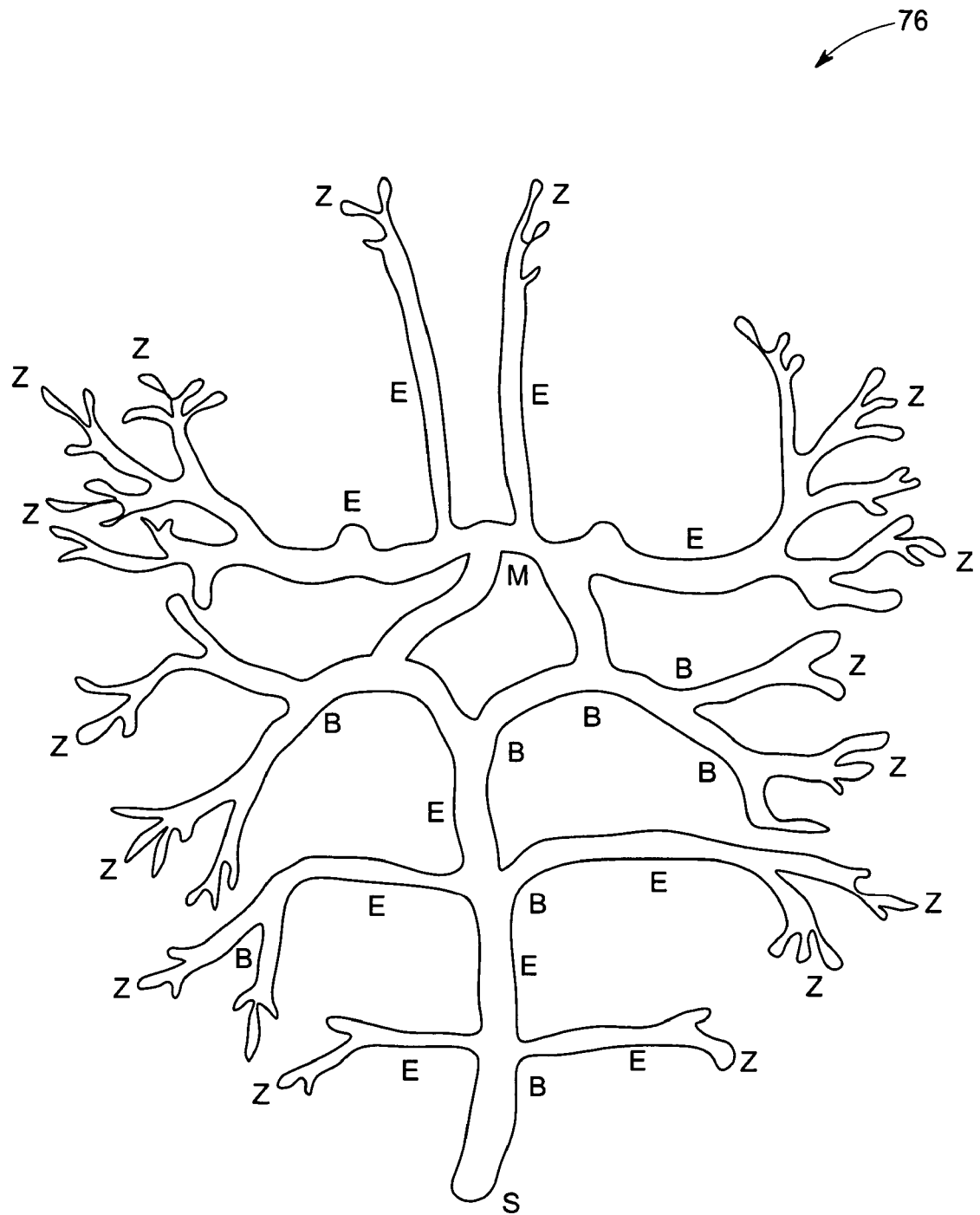
FIG. 9 illustrates a blood vessel network as an example that can be modeled in accordance with one aspect of the present technique.

For example, FIG. 9 illustrates a blood vessel network 76 with its vertices and/or edges identified and labeled. The heart or other blood producing organs acts as a source while the different organs receiving blood may act as a sink. The blood vessels such as arteries, veins, capillaries are the edges with its complex network where they may merge at a merge vertex or may branch out at a branch vertex. The operational direction is decided based on the blood flow in various organs.

Figure 10:
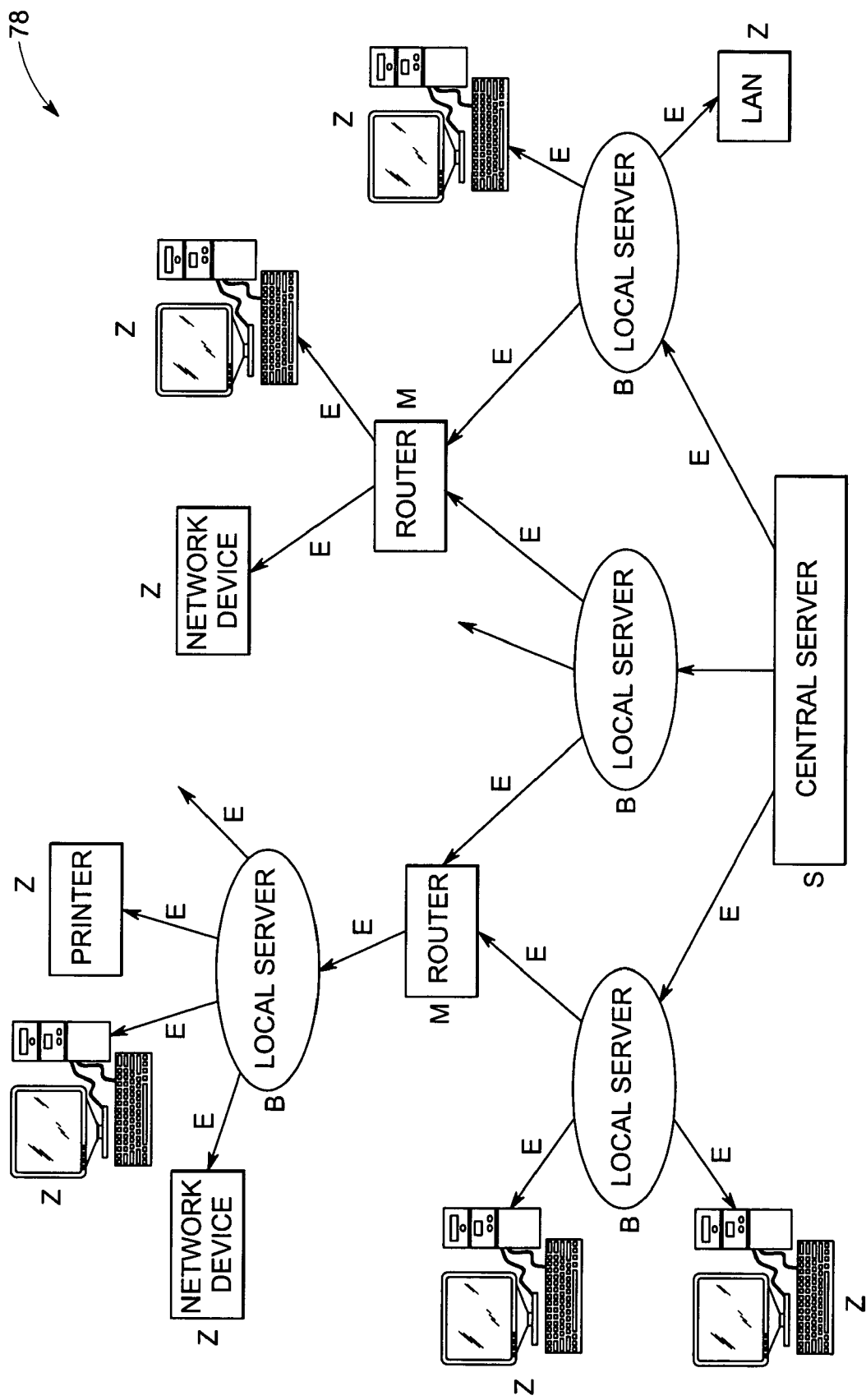
FIG. 10 illustrates a computer network as another example that can be modeled in accordance with one aspect of the present technique.

FIG. 10 illustrates another example of a computer network 78 such as a local area network (LAN), a wide area network (WAN) or at least a part of the Internet. As illustrated, the computer network 78 may include a wide array of devices such as a desktop terminal, a printer, a router, a local server, a central server, a LAN and/or other network devices, all connected to the network. These network devices may be labeled into various types of vertices and the connections between them may be labeled as edges connecting various devices. The operational direction may be decided based on the information flow between these interconnected network devices.

Figure 11:
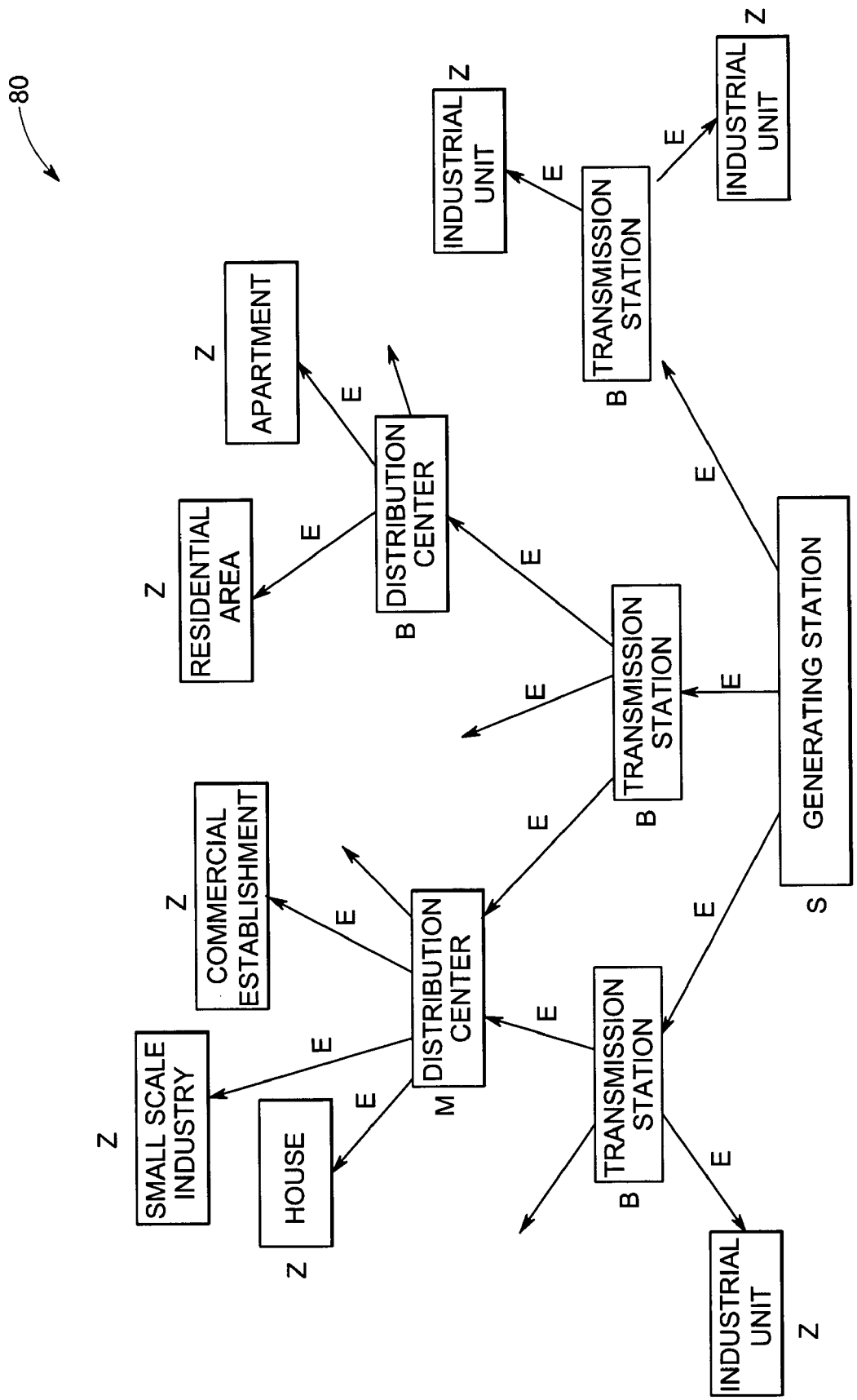
FIG. 11 illustrates a power distribution network as yet another example that can be modeled in accordance with one aspect of the present technique.

FIG. 11 illustrates yet another example of a power distribution network 80 for transmitting electrical power from a generating station to various users. As illustrated, the power distribution network 80 may include a generating station, a transmission station, a distribution center and/or consumer units such as industrial units, residential apartments and/or colonies, commercial establishment, small scale industries, railways and others. The generating station may be labeled as a source vertex while the consumer unit may be labeled as a sink vertex. The transmission station may be labeled as a branch or a merge vertex depending upon the number of distribution center it is connected to or number of generating station it is connected to. Similarly, the distribution center may be labeled as a branch or merge vertex. The transmission wires connecting these units may be considered as edges of the network relationship and the operational direction is decided based on the power flow from the generating station to the consumer units.

Figure 12:
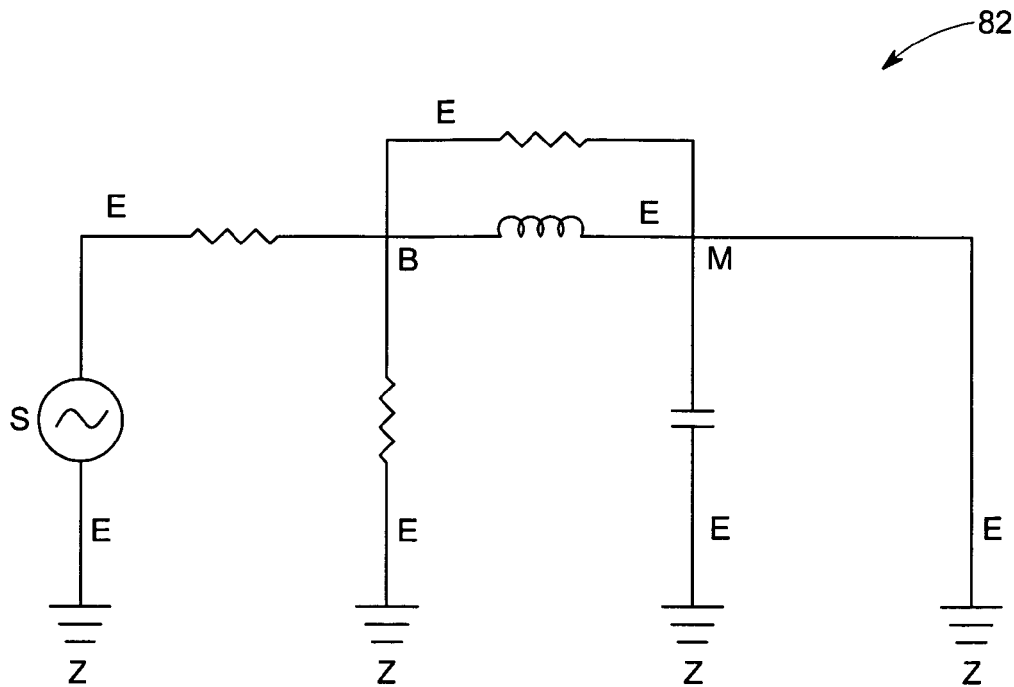
FIG. 12 illustrates a electrical circuit network as a further example that can be modeled in accordance with one aspect of the present technique.

FIG. 12 illustrates yet another example of an electrical circuit network 82. As illustrated, the electrical circuit network 82 may include a wide variety of circuit components such as one or more power sources, resistors, capacitors, inductors, electrical loads and/or other components. These circuit components may be labeled into various types of vertices and the connections between them may be labeled as edges connecting various vertices. The operational direction may be decided based on the flow of electrical current between these circuit components.

Once the planar graph representing the network relationship is labeled, the network relationship may be interactively visualized and/or analyzed via one or more tools based on the operation on the symbol sequence. These one or more tools may include a pruning tool to limit visualization of the network relationship, a compositeness tool to identify a degree of connectivity of one portion to other portions of the network relationship, a roundness tool to identify a number of connections between two portions of the network relationship, an opacity tool to alter opacity of different portions of the network relationship, and/or a color visualization tool to set one or more colors to different portions of the network relationship. A graphical interface may be provided for interactively visualizing and/or analyzing the network relationship via the one or more tools mentioned above.

Figure 13:
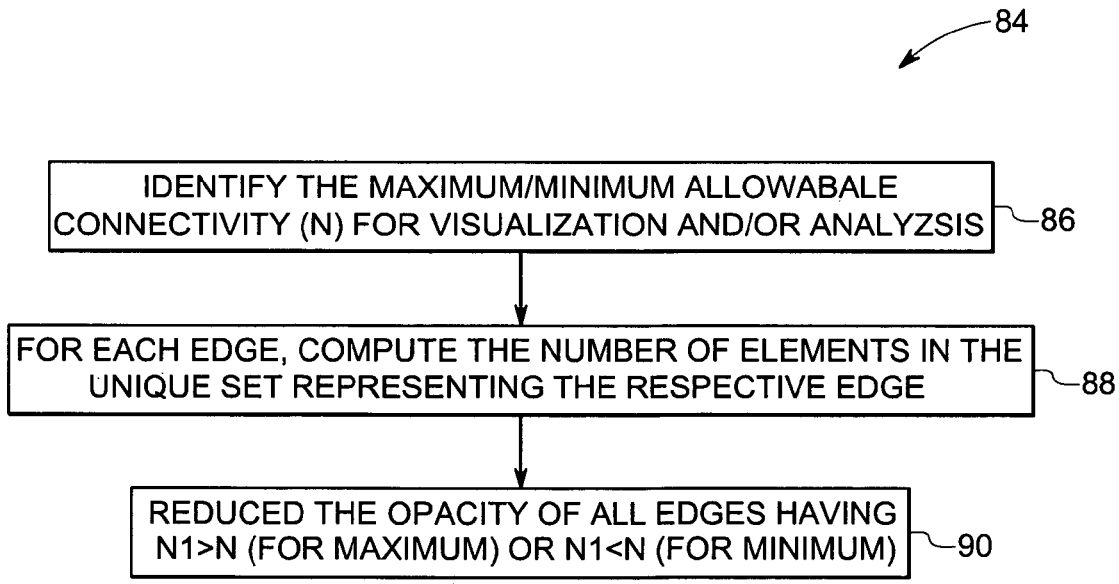
FIG. 13 is a flowchart illustrating an exemplary method of pruning a labeled graph in accordance with one aspect of the present technique.

FIG. 13 illustrates an exemplary process 84 for pruning the graphical representation of a network relationship based on the symbol sequence. Based on a degree of pruning required, maximum and/or minimum allowable connectivity (N) is identified for visualization and/or analysis for a particular graph at block 86. For each edge, the number of elements (N1) in the unique set representing the respective edge is then computed at block 88. Finally, the opacity of all the edges having N1>N (for maximum allowable connectivity) and/or N1<N (for minimum allowable connectivity) is reduced at block 90. In one embodiment, where a prime number sequence is used for labeling the planar graph representing the network relationship, the number of divisors (N1) of all the edges is calculated. The opacity of all the edges having N1>N (for maximum allowable connectivity) and/or N1<N (for minimum allowable connectivity) is then reduced to obtain a pruned graph. The unique labeling technique described above preserves the hierarchy of the pruned graph irrespective of their sizes or intensities. Thus an edge with a larger numeric label that is farther from the root and hence is less important than a vessel with a smaller numeric label gets pruned.

Figure 14:
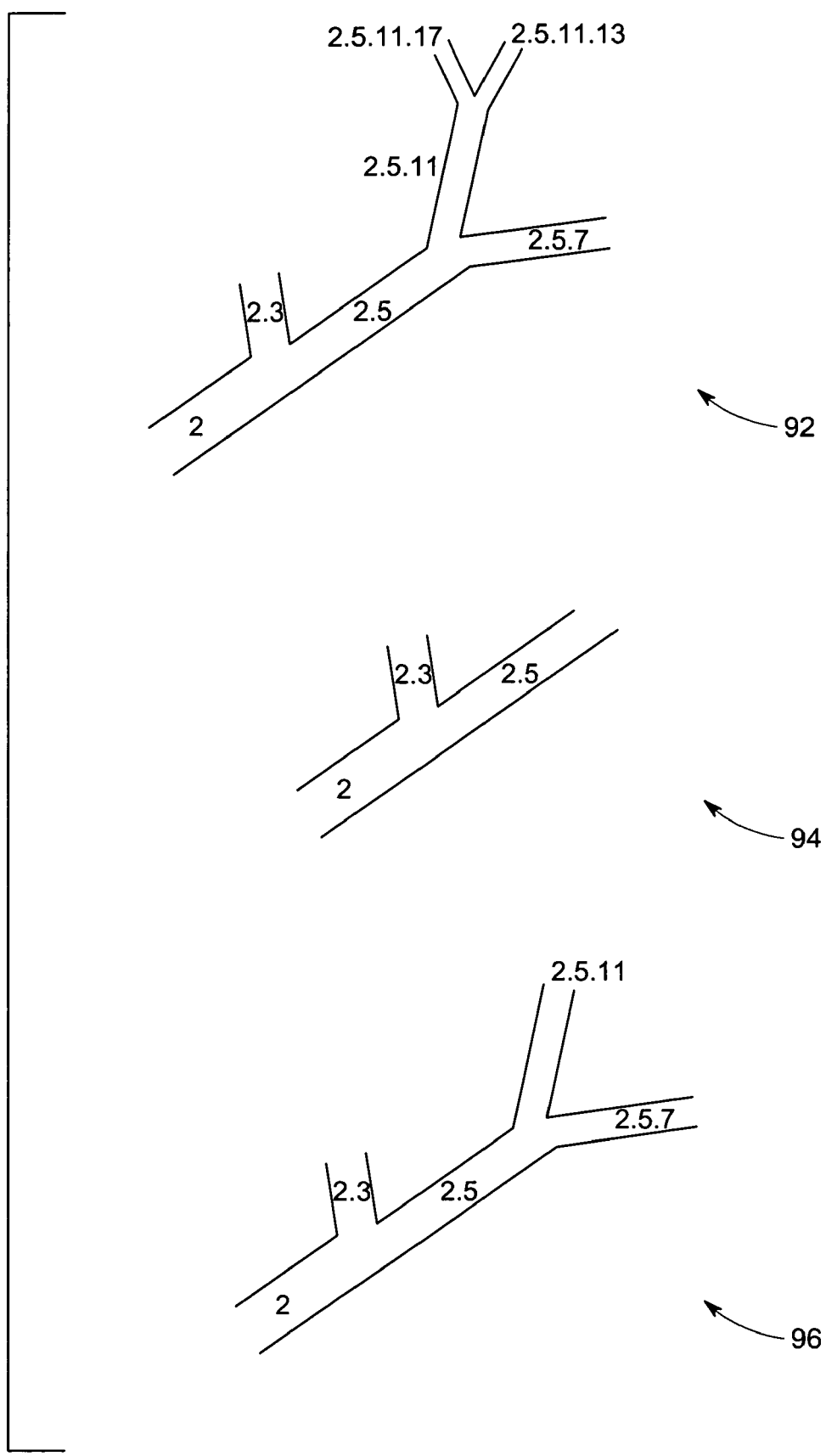
FIG. 14 is an example of a pruned network in accordance with method illustrated in FIG. 11.

FIG. 14 illustrates an example of pruning on a portion of the planar graph 92 in accordance with the process 84 described above. The planar graph 94 is a pruned version of the portion of the planar graph 92 with maximum number of divisors 2, while the planar graph 96 is a pruned version of the portion of the planar graph 92 with maximum number of divisors 3.

The number of elements in the unique set representing a particular edge determines the degree of compositeness of that particular edge. In case where prime numbers are used to label the planar graph, the number of divisors of the label of the particular edge determines the degree of compositeness of that particular edge. Edges having a high degree of compositeness indicate that they have more number of connections to other edges in the planar graph. This may indicate the dependency or redundancy of a particular edge. For example, an edge with label of 180 has 17 divisors thereby indicating that the edge may be potentially connected to 17 other edges with those particular labels. Such information may be useful in many ways. For example, in case of blood vessel network or neurovascular network it may be useful to a doctor to know the dependency or redundancy of a particular blood vessel or neuron while planning for surgery. Similarly, in a power system network, it may be useful for a technician to know the dependency or redundancy of a particular transmission line during fault analysis or maintenance operations.

Roundness is defined as the sum of the powers of the prime factors in the decomposition of a particular label. For example, the roundness of an edge having the label $72=2^3 \times 3^2$ is $3+2=5$. This indicates the number of connection that exists between two edges. Higher roundness implies that there is more redundancy between two particular edges. In the above example, there are three connections between edges having labels 72 and 2, while there are two connections between edges having labels 72 and 3.

Figure 15:
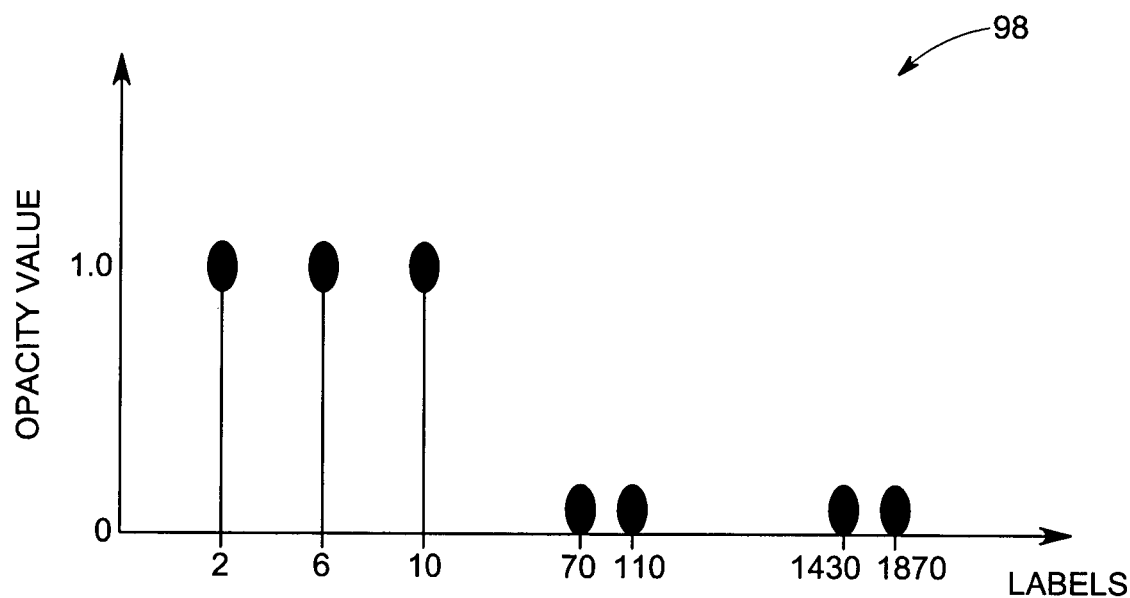
FIG. 15 illustrates an opacity transfer function for altering opacity of different portions of the network in accordance with one aspect of the present technique.

Further, the present technique includes different transfer functions to control the visualization of the graphical representation of the network relationships based on the respective labels of the edges. For example, an opacity transfer function 98 as illustrated in FIG. 15 may be used to alter opacity of different portions of the network relationship based on their labels. As illustrated, the opacity transfer function 98 sets the opacity of edges represented by labels '70', '110', '1430', and '1870' to zero. This is a useful tool if we are interested in visualizing and analyzing a specific part or region of the network. As would be appreciated by one skilled in the art, the opacity transfer function 98 may be used while pruning a planar graph. Referring back to the planar graph 94 of FIG. 14, the opacity of all the edges with the number of divisors greater than 2 may be reduced, while in the planar graph 96 opacity of all the edges with the number of divisors greater than 3 may be reduced.

Figure 16:
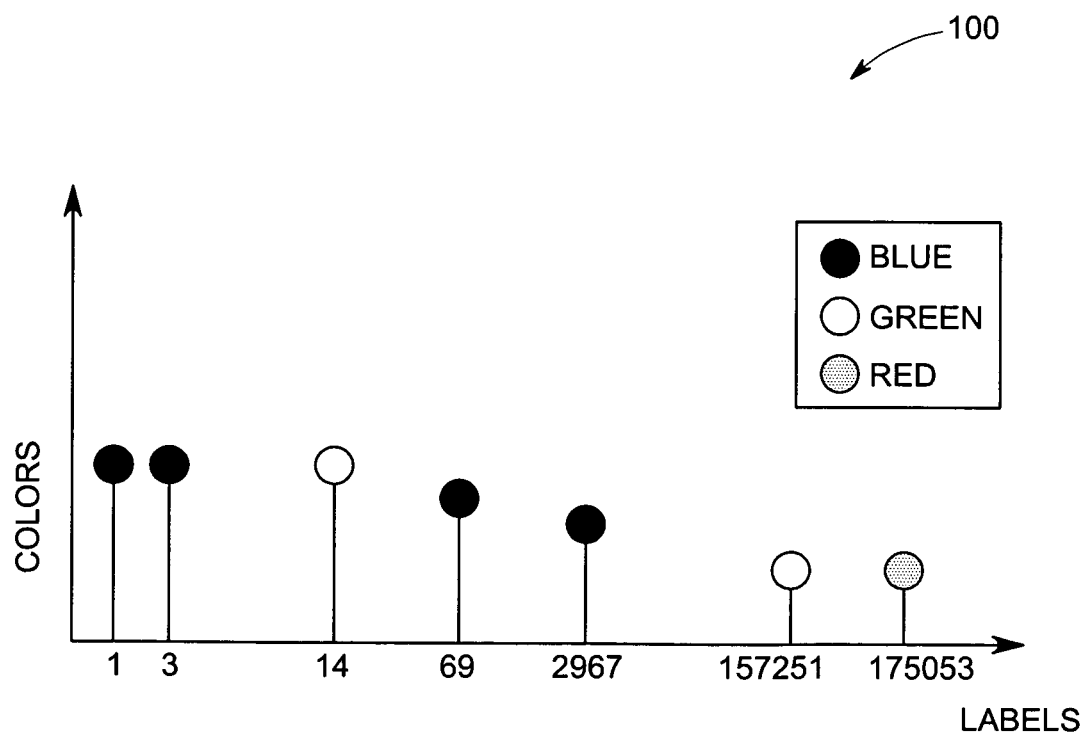
FIG. 16 illustrates a color transfer function for setting different colors to different portions of the network in accordance with one aspect of the present technique.

In addition, a color transfer function 100 as illustrated in FIG. 16 may be used to set different colors to different portion of the network relationship based on their labels. The tool can be useful in visualizing different portion of network in different colors under a particular situation. As illustrated, the color transfer function 100 sets the color of edges represented by labels '1', '3', '69' and 2967 to blue, the color of edges represented by labels '14' and '157251' to green and the color of edge represented by label '175053' to red. For example, suppose there is a fault in one of the transmission lines in a power distribution network or a cut in one of the blood vessel in a blood vessel network. A technician or a doctor will be interested in knowing the branches that are affected by the particular fault or a cut. This fault or cut is represented as an edge having a particular label in the planar graph representing a network relationship. For prime number sequence based labeling with invertible composite function as multiplication of prime factors, all edges that are affected by the faulty edge will have labels that are a multiple of the label of the faulty edge. Similarly, all edges feeding into the faulty edge will be factors of the label of the faulty edge. Any other edge having a label that is relatively prime to the label of the faulty edge will remain unaffected by the fault or the cut. This information can be easily shown via different colors set via the color transfer function 100. For example, edges feeding into the faulty edge may be set with a blue color and edges that are affected by the faulty edge or more precisely edges that are fed by the faulty edge may be set with a red color. All other edges that are not directly affected by the faulty edge may be set with a green color.

It should be noted that depending on the complexity of the network and the symbol sequence used, the values of the labels obtained may tend to be quite large, thereby leading to overflow problems. This problem becomes is prominent for any super-multiplicative number sequences. For a very large network, such as those of the neurovascular, the number of vessel and interconnections may exceed 100, the prime factors get multiplied and the values of the label bloat exponentially. Such situations may be avoided by taking logarithm to any base that may result in smaller numbers and convert the operation of multiplication to that of addition. Alternatively, a super-additive number sequence such as Fibonacci number sequence or any base-N number sequence may be used that employs addition operation or some other symbol sequence may be used.

Figure 17:
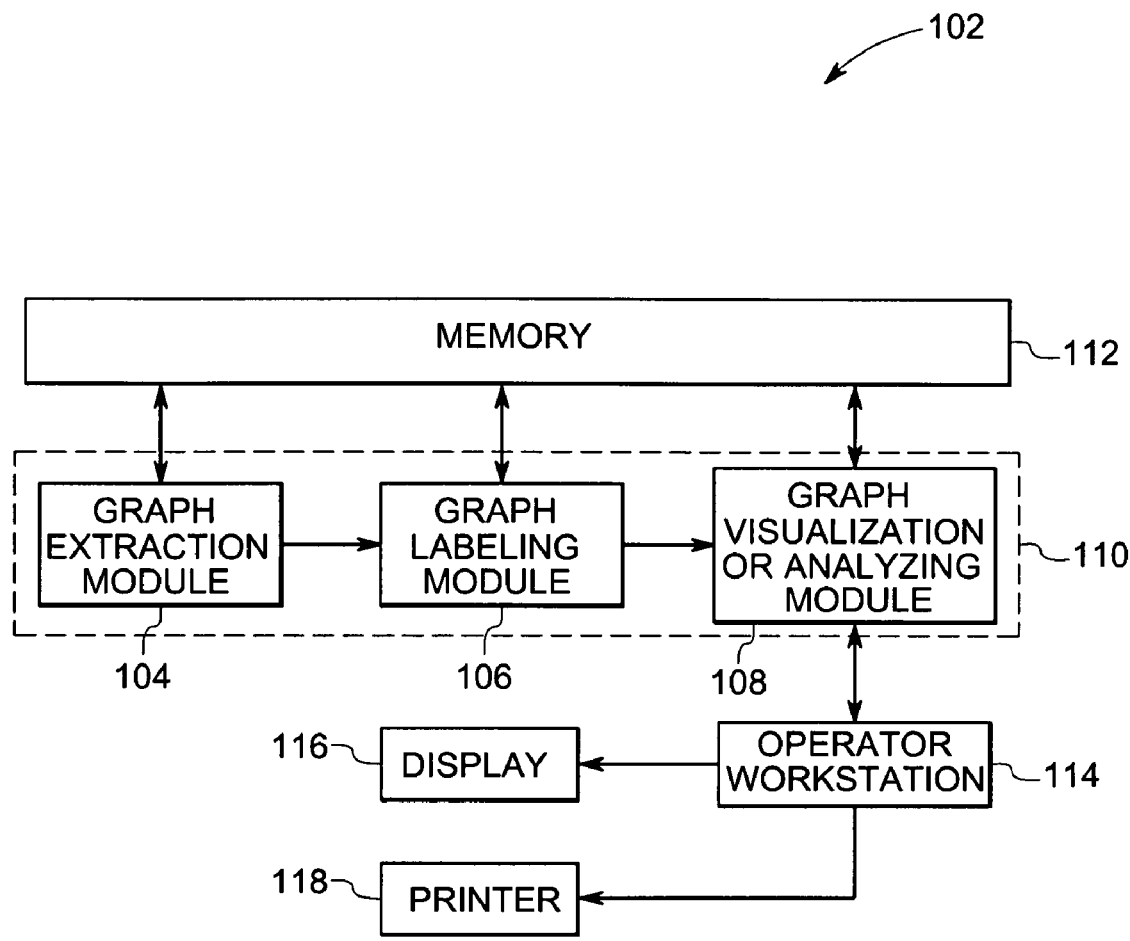
FIG. 17 illustrates a system for modeling a network relationship in accordance with one aspect of the present technique.

All the above mentioned techniques may be employed through any general purpose computer for modeling of a network relationship. As illustrated in FIG. 17, a system 102 for modeling a network relationship includes modules for graph extraction 104, graph labeling 106, and graph visualization and/or analysis 108. These modules may be present separately as a special purpose circuitry 110 or may be present as a part of the computer. The system 102 may further include or be in communication with memory 112. It should be understood that any type of memory 112 to store a large amount of data may be utilized by such an exemplary modeling system 102. As illustrated, the graph extraction module 104 may process the n-dimensional data set representing the network relationship residing in the memory 112 and extract a graph representing the network relationship in accordance with the technique described above. The extracted planar graph may then be stored in the memory 112 or may be further processed by the graph-labeling module 106. The graph-labeling module 106 may then label the extracted graph in accordance with the technique described above. Alternatively, a pre-loaded graph may be loaded from the memory 112 and labeled by the graph-labeling module 106. The labeled graph may then be stored in the memory 112 or may be processed by graph visualization and/or analysis module 108 for interactively visualizing and/or analyzing the graph. As would be appreciated by one skilled in the art, a pre-stored labeled graph may be processed by the graph visualization and/or analysis module 108 for the purpose of visualization and/or analysis.

In addition, the system 102 may be configured to receive commands and scanning parameters from an operator via an operator workstation 114. For example, the operator workstation 114 may be equipped with a keyboard and/or other input devices by which an operator may control the modeling system 102. Thus, the operator may visualize and/or analyze the network relationship and its associated problem via an interactive graphical interface, initiate modeling, and so forth.

A display 116 may be coupled to one of the operator workstation 114 and may be utilized to visualize and/or analyze the network relationship and to control visualization via the interactive graphical interface. Additionally, the graphical representation of the network relationship may also be printed on to a printer 118 that may be coupled to the operator workstation 114, either directly or over a network. It should be further noted that the system 102 and/or operator workstation 114 may be coupled to other output devices that may include standard or special purpose computer monitors and associated processing circuitry. Furthermore, additional operator workstations may be further linked in the system 102 for outputting system parameters, performing visualization and/or analysis and so forth, so that more than one operator may perform visualization and/or analysis.

Figure 18:
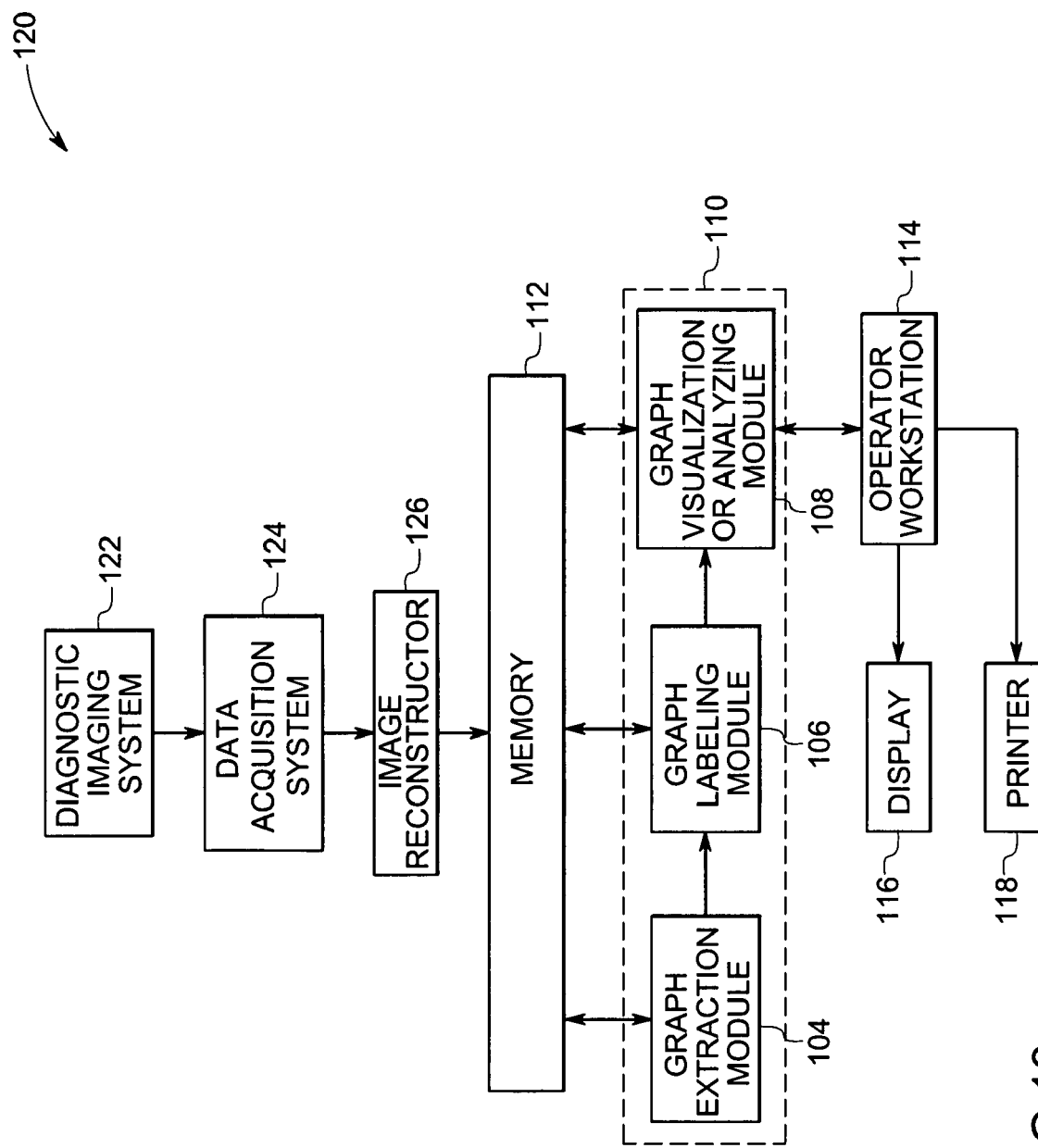
FIG. 18 illustrates an imaging system for visualizing and/or analyzing a physiological network in accordance with one aspect of the present technique.

In one embodiment, an imaging system 120 as illustrated in FIG. 18 includes the system 102 for modeling the network relationship described above coupled to one or more diagnostic imaging system 122, such as a CT system, an MRI system, an X-ray imaging system, a PET system and others. These diagnostic imaging systems 122 collects n-dimensional data set representing the blood vessel network or neurovascular network via data acquisition circuitry 124. The n-dimensional data set is then stored in the memory 112 of the modeling system. Alternatively, an image reconstructor 126 may reconstruct the image from the n-dimensional data sets and the image is stored in the memory 112 of the modeling system. The blood vessel network or the neurovascular network is then modeled via the modeling system 102 as described above.

Figure 19:
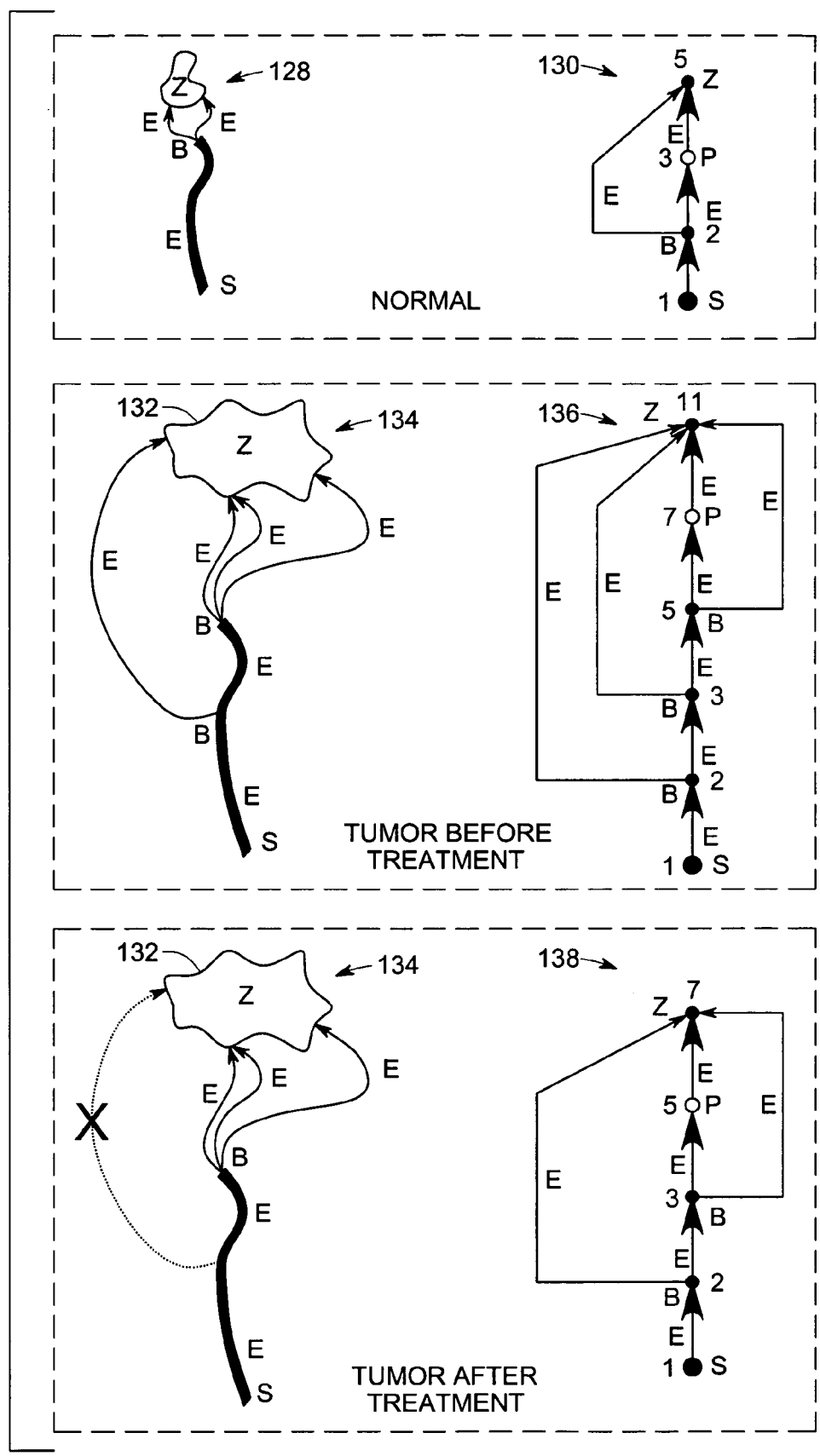
FIG. 19 illustrates an example of identifying, analyzing and tracking the progress of treatment in case of malignant tumor development.

The modeling of the blood vessel network and/or neurovascular network via the imaging system 120 described above may help in visualization and/or analysis of many medical problems, such as for identifying potentially life-threatening aneurysms, or planning surgical operations, or for other purposes. For example, as illustrated in FIG. 19, a tumor is identified and monitored via the imaging system 120 described above. In the top portion of FIG. 19, this figure illustrates a top of the brain 128 that acts as a sink vertex under a normal condition. A graphical representation 130 of the blood vessels in this particular region is extracted and labeled in accordance with the techniques described above. If a malignant tumor 132 develops in this region, the tumor 132 will act as sink and will draw large amounts of blood from surrounding regions. Accordingly, new arteries will be formed feeding blood to the tumor 132 in the region 134. The number of arteries leading into the tumor (sink vertex) 132 can be computed by finding the degree of compositeness, thereby identifying and classifying the tumor 132 in the region 134. Compositeness is an indicator of degree of arterial supply. Malignant tumor 132 can therefore be differentiated through a higher compositeness factor. The middle portion of FIG. 19 illustrates a graphical representation 136 of the blood vessel in this particular region having malignant tumor 132 before the treatment. The method may be used to track the effectiveness of therapy. If sometime later the arterial tree has changed and the compositeness is lower after treatment, as illustrated in the lower portion of FIG. 19 via the graphical representation 138, it can be concluded that arterial supply is reducing and hence the tumor 132 is dying.

Figure 20:
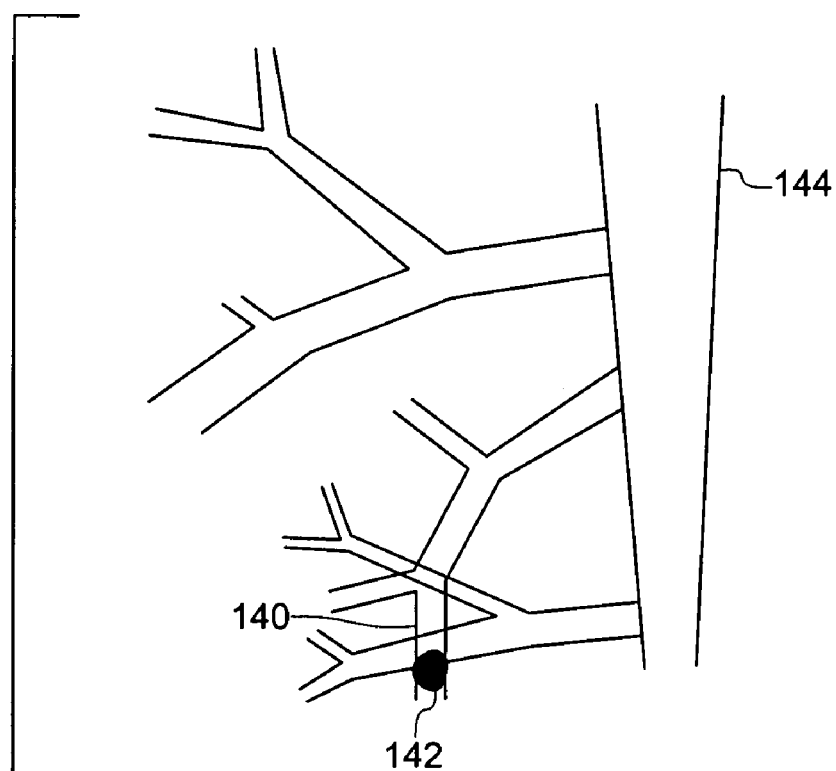
FIG. 20 illustrates an example of detecting and recording the path from the root to a blocked artery in case of a pulmonary embolism.
Figure 20:
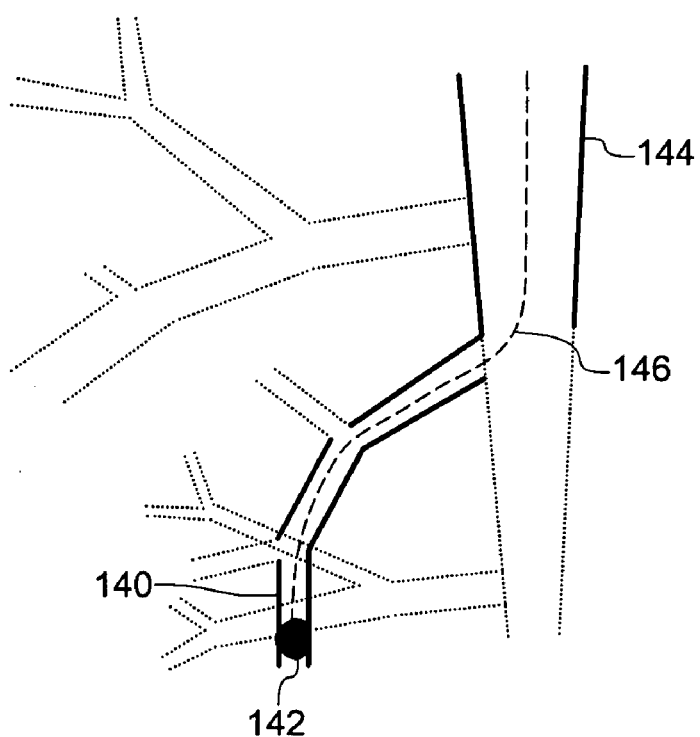

FIG. 20 illustrates another example of visualizing and/or analyzing a pulmonary embolism via the imaging system 120 described above. As illustrated, pulmonary embolism is a condition that occurs when an artery 140 in lungs is blocked due to one or more blood clots 142 that travel to lungs from another part of the body. In some cases, other types of clots such as globules of fat, air bubbles, tissue from a tumor or a clump of bacteria may also lead to blockage. Detection of the path of the blocked artery 140 from root 144 is generally tedious and is based on trial and error. However, as illustrated, once the blocked artery 140 has been identified, the imaging system 120 automatically finds and displays the path 146 from the root 144 to the blocked artery 140 based on the labeled graphical representation. This improves the diagnosis and treatment of the pulmonary embolism, while reducing the risk to the patient. Further, the topology and segmental relationship may be recorded for future reference.

The graph extraction, labeling, visualization and/or analyzing techniques described in the various embodiments mentioned above provide intelligent, automatic and interactive visualization and analysis of various network relationship. Intelligent labeling of the graph by using symbol sequence is such that connectivity information is embedded, in the unique symbol representing the edges of the network relationship. On the fly automatic adaptation of visualization parameters such as color and opacity for highlighting an edge and its parent/child braches. As opposed to computationally intensive brute force graph search, the techniques described in the various embodiments discussed above allows instantaneous access to parent and children of selected vessel through prime decomposition of the label. Computation of the prime factors is of very low computational burden and can be further speeded up by using a look-up-table that lists all the labels and their corresponding prime decompositions. The look-up-table is very useful where the network is small. On the whole, the above mentioned techniques results in improved computational efficiency. In addition, the extracted graphical representation of the network relationship is spatially independent as it just carries information about the topology of the network.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of modeling a network relationship, the method comprising:
   providing a graphical representation of the network relationship by extracting the graphical representation from an n-dimensional data set representing the network relationship using a modeling system; and
   labeling the graphical representation using the modeling system based on a symbol sequence, wherein the symbol sequence comprises a super-additive number sequence or a super-multiplicative number sequence.

2. The method of claim 1, further comprising identifying an operational direction of the network relationship.

3. The method of claim 1, further comprising identifying one or more vertices and/or edges of the network relationship.

4. The method of claim 3, wherein labeling the graphical representation comprises referencing each vertex of the network relationship with a unique symbol from the symbol sequence.

5. The method of claim 3, wherein labeling the graphical representation comprises referencing each edge of the network relationship with a unique symbol derived from an invertible composite function applied on all the symbols representing a plurality of vertices from one or more source vertices of the network relationship to a destination vertex of the respective edge.

6. The method of claim 1, wherein labeling comprises sequentially uniquely referencing origination and termination points of segments of the network relationship with a unique symbol from one or more segments to one or more hierarchically arranged segments in the network relationship.

7. The method of claim 1, wherein labeling comprises referencing a desired segment in a set of successively connected segments of the network relationship with a set of unique symbols, wherein the set of unique symbols includes a unique symbol for each of the origination and/or termination points for the different segments in the set of successively connected segments.

8. The method of claim 1, wherein the symbol sequence further comprises a number sequence, or a string sequence, or an alphanumeric sequence, or a sign sequence.

9. The method of claim 1, wherein the super-additive number sequence or the super-multiplicative number sequence comprises a prime number sequence, or a Fibonacci number sequence, or a number sequence based on powers of a base number.

10. The method of claim 1, further comprising providing one or more tools for interactively visualizing and/or analyzing the graphical representation of the network relationship based on the symbol sequence.

11. The method of claim 10, wherein the one or more tools comprises a pruning tool to limit visualization of the network relationship based on the symbol sequence.

12. The method of claim 10, wherein the one or more tools comprises a pruning tool to limit visualization of the network relationship based on a hierarchy based pruning of the labeled graphical representation.

13. The method of claim 10, wherein the one or more tools comprises a compositeness tool to identify a degree of connectivity of one portion to other portions of the network relationship based on the symbol sequence.

14. The method of claim 10, wherein the one or more tools comprises a roundness tool to identify a number of connections between two portions of the network relationship based on the symbol sequence.

15. The method of claim 10, wherein the one or more tools comprises a opacity tool to alter opacity of different portions of the network relationship based on the symbol sequence.

16. The method of claim 10, wherein the one or more tools comprises a color visualization tool to set one or more colors to different portions of the network relationship based on the symbol sequence.

17. The method of claim 1, wherein the network relationship comprises a blood vessel network, or a biological neural network, or an electrical circuit network, or a power distribution network, or a wiring network, or a communication network, or a computer network, or at transportation network, or an air traffic network, or a road network, or a network of rivers and/or tributaries, or a flow network.

18. A computer readable storage media, comprising:
    code adapted to provide a graphical representation of a network relationship, wherein the code adapted to provide the graphical representation of the network relationship comprises code adapted to extract the graphical representation from an n-dimensional data set representing the network relationship; and
    code adapted to label the graphical representation based on a symbol sequence, wherein the symbol sequence comprises a super-additive number sequence or a super-multiplicative number sequence.

19. The computer readable storage media of claim 18, further comprising code adapted to provide a plurality of tools for interactively visualizing and/or analyzing the graphical representation of the network relationship based on the symbol sequence.

20. A system for modeling a network relationship, the system comprising:
    means for providing a graphical representation of the network relationship by extracting the graphical representation from an n-dimensional data set representing the network relationship; and
    means for labeling the graphical representation based on a symbol sequence, wherein the symbol sequence comprises a super-additive number sequence or a super-multiplicative number sequence.

* * * * *